United States Patent
Meyers et al.

(10) Patent No.: US 12,491,333 B2
(45) Date of Patent: Dec. 9, 2025

(54) URINARY CATHETER SYSTEMS AND METHODS

(71) Applicant: Augment Health, Inc., Franklin, TN (US)

(72) Inventors: Jared P. Meyers, Franklin, TN (US); Stephen T. Kalinsky, Great Falls, VA (US); Camille Diaz Garcia, San Juan, PR (US)

(73) Assignee: AUGMENT HEALTH, INC., Franklin, TN (US)

( * ) Notice: Subject to any disclaimer, the term of this patent is extended or adjusted under 35 U.S.C. 154(b) by 0 days.

(21) Appl. No.: 18/050,670

(22) Filed: Oct. 28, 2022

(65) Prior Publication Data

US 2023/0106221 A1    Apr. 6, 2023

Related U.S. Application Data

(63) Continuation of application No. PCT/US2021/046748, filed on Aug. 19, 2021.

(Continued)

(51) Int. Cl.
*A61M 25/00* (2006.01)

(52) U.S. Cl.
CPC . *A61M 25/0017* (2013.01); *A61M 2025/0001* (2013.01)

(58) Field of Classification Search
CPC ......... A61B 5/205; A61B 5/204; A61B 5/208; A61B 5/202; A61B 5/6874; A61B 5/746;
(Continued)

(56) References Cited

U.S. PATENT DOCUMENTS

| | | | | |
|---|---|---|---|---|
| 4,532,936 A | * | 8/1985 | LeVeen | A61B 5/201 604/323 |
| 4,745,929 A | * | 5/1988 | Silver | A61B 5/208 604/323 |

(Continued)

FOREIGN PATENT DOCUMENTS

| AU | 2017204214 A1 | 7/2017 |
|---|---|---|
| AU | 2019203634 B2 | 6/2019 |

(Continued)

OTHER PUBLICATIONS

Extended European Search Report dated Jul. 19, 2024 for European Patent Appl. No. 21859150.1.

(Continued)

*Primary Examiner* — Adam Marcetich

(74) *Attorney, Agent, or Firm* — Husch Blackwell LLP; Bryan D. Stewart

(57) ABSTRACT

The present disclosure discusses a urinary catheter attachment that is equipped with a sensor and microcontroller that monitors bladder parameters, such as pressure or volume, and determines when the bladder is full and should be voided. In various embodiment, the disclosed system allows individuals who cannot know, feel, or remember when their bladder should be voided to use catheter accessories such as catheter valves. According to various embodiments, the system computes bladder fullness through an algorithm and triggers the alert system when a bladder fullness threshold is passed. In various embodiments, the alert system includes, but is not limited to, notifications via smartphone or smart devices, wearable technology, and patient management systems. The alert system may be substituted with an electronically actuated catheter valve.

20 Claims, 14 Drawing Sheets

Related U.S. Application Data

(60) Provisional application No. 63/067,689, filed on Aug. 19, 2020.

(58) Field of Classification Search
CPC .. A61B 5/036; A61B 10/007; A61M 25/0017; A61M 2025/0002; A61M 2025/0206; A61M 2025/0213; A61M 2202/0496
See application file for complete search history.

(56) References Cited

U.S. PATENT DOCUMENTS

| | | | |
|---|---|---|---|
| 4,891,993 A * | 1/1990 | Barker | A61B 5/14507 73/863.52 |
| 5,058,591 A * | 10/1991 | Companion | A61B 8/0858 600/449 |
| 6,817,983 B1 * | 11/2004 | Millar | A61B 5/0215 600/561 |
| 7,977,529 B2 | 7/2011 | Bergman | |
| 8,052,671 B2 | 11/2011 | Christensen | |
| 8,233,957 B2 | 7/2012 | Merz | |
| 8,337,411 B2 | 12/2012 | Nishtala | |
| 8,337,476 B2 | 12/2012 | Greenwald | |
| 8,761,888 B2 | 6/2014 | Gerber | |
| 9,061,146 B2 | 6/2015 | Gerber | |
| 9,185,489 B2 | 11/2015 | Gerber | |
| 9,492,113 B2 | 11/2016 | Nagale | |
| 9,763,615 B2 | 9/2017 | Xu | |
| 10,085,694 B2 | 10/2018 | Nagale | |
| 10,405,789 B2 | 9/2019 | Ramu | |
| 10,542,923 B2 | 1/2020 | Chang | |
| 10,744,298 B1 | 8/2020 | Bello | |
| 2003/0036802 A1 | 2/2003 | Lennox | |
| 2003/0167022 A1 | 9/2003 | Dijkman | |
| 2004/0260163 A1 | 12/2004 | Kron | |
| 2005/0209513 A1 * | 9/2005 | Heruth | A61N 1/36071 600/549 |
| 2006/0235353 A1 * | 10/2006 | Gelfand | A61B 5/208 604/67 |
| 2007/0027494 A1 * | 2/2007 | Gerber | A61B 5/204 607/41 |
| 2007/0100387 A1 * | 5/2007 | Gerber | A61N 1/36007 607/41 |
| 2007/0123778 A1 * | 5/2007 | Kantorovich | G01S 15/88 600/437 |
| 2008/0027373 A1 * | 1/2008 | Holte | A61M 25/0017 604/27 |
| 2008/0300470 A1 * | 12/2008 | Gerber | A61B 5/202 600/301 |
| 2009/0221933 A1 | 9/2009 | Nishtala | |
| 2010/0312225 A1 | 12/2010 | Armistead | |
| 2013/0218106 A1 * | 8/2013 | Coston | A61M 1/00 604/317 |
| 2013/0310706 A1 | 11/2013 | Stone | |
| 2014/0167190 A1 * | 6/2014 | Hodgson | B81C 3/005 438/51 |
| 2014/0200482 A1 | 7/2014 | Shi | |
| 2014/0378918 A1 * | 12/2014 | Dong | A61M 1/70 604/328 |
| 2015/0366498 A1 * | 12/2015 | Choi | A61B 5/742 600/373 |
| 2016/0058412 A1 * | 3/2016 | Yoshimura | A61B 8/0858 600/438 |
| 2016/0258937 A1 | 9/2016 | Ellington | |
| 2017/0100068 A1 * | 4/2017 | Kostov | A61J 1/18 |
| 2017/0241978 A1 * | 8/2017 | Duval | A61M 25/00 |
| 2017/0340259 A1 | 11/2017 | Lawrence | |
| 2018/0110456 A1 | 4/2018 | Cooper | |
| 2018/0231167 A1 * | 8/2018 | Wallace | G01K 13/02 |
| 2018/0303655 A1 * | 10/2018 | Glithero | A61L 29/146 |
| 2019/0046101 A1 * | 2/2019 | Tsukada | A61B 5/6874 |
| 2019/0142324 A1 * | 5/2019 | Papirov | G01F 23/00 600/407 |
| 2019/0216401 A1 | 7/2019 | Brody | |
| 2019/0357836 A1 * | 11/2019 | Yang | A61B 8/56 |
| 2020/0022638 A1 * | 1/2020 | Suehara | A61B 5/204 |
| 2020/0038629 A1 * | 2/2020 | Brody | A61B 5/389 |
| 2020/0139109 A1 * | 5/2020 | Imran | A61N 1/36007 |
| 2020/0164184 A1 * | 5/2020 | McKinney | A61B 5/205 |
| 2020/0205718 A1 * | 7/2020 | Silverton | A61B 5/14552 |
| 2020/0230406 A1 * | 7/2020 | Brink | A61N 1/36167 |
| 2020/0268302 A1 * | 8/2020 | Oh | A61B 5/227 |
| 2020/0390381 A1 | 12/2020 | Cooper | |
| 2021/0330933 A1 * | 10/2021 | Miller | A61M 25/0017 |
| 2021/0353195 A1 * | 11/2021 | Beer | A61B 5/6856 |
| 2022/0347430 A1 * | 11/2022 | Pedersen | A61M 25/0045 |

FOREIGN PATENT DOCUMENTS

| | | | | | |
|---|---|---|---|---|---|
| CN | 106361358 A | * | 2/2017 | | A61B 5/205 |
| CN | 109091709 A | * | 12/2018 | | A61B 5/205 |
| DE | 4111961 A1 | | 10/1992 | | |
| DE | 102009043955 A1 | * | 3/2011 | | A61B 5/204 |
| DE | 102011090201 B3 | * | 5/2013 | | A61B 5/00 |
| GB | 2395128 A | * | 5/2004 | | A61B 5/14539 |
| JP | 2016520804 A | | 7/2016 | | |
| JP | 2019063539 A | | 4/2019 | | |
| WO | 2004098686 A1 | | 11/2004 | | |
| WO | 2019195028 A1 | | 10/2019 | | |
| WO | 2021146701 A1 | | 7/2021 | | |

OTHER PUBLICATIONS

International Preliminary Report on Patentability issued Feb. 16, 2023 for Intl Pat Appl No. PCT/US21/46748.
International Search Report and Written Opinion mailed Nov. 30, 2021 for Intl Pat Appl No. PCT/US21/46748.

* cited by examiner

URINARY CATHETER SYSTEMS AND METHODS

CROSS-REFERENCE TO RELATED APPLICATIONS

This application is a continuation of International PCT Patent Application No. PCT/US21/46748, filed Aug. 19, 2021, entitled "URINARY CATHETER SYSTEMS AND METHODS," which claims the benefit of and priority to U.S. Provisional Patent Application 63/067,689, filed Aug. 19, 2020, and entitled "Catheter Accessory System and Method for Monitoring, Detecting, and Notifying Bladder Fullness for Controlled Voiding," the entireties of which are incorporated herein by reference.

BACKGROUND

Urinary incontinence, a condition that stems from impacted bladder sphincter control, is often managed using urinary catheters to assist bladder voidance. Urinary catheters drain urine from the bladder when individuals cannot do so themselves, such as following surgery or disease onset. These catheters can be classified as either intermittent, where the catheter is removed after bladder voidance is completed, or indwelling, where the catheter remains in place between instances of bladder voidance.

The two most common types of indwelling urinary catheters are suprapubic and urethral catheters. Both consist of hollow, flexible tubing. Suprapubic catheters are inserted into the bladder via a stoma, whereas urethral catheters, commonly referred to as Foley catheters, are inserted into the bladder via the urethra. Both indwelling catheter types have a balloon on one end that is inserted into the bladder and expanded to secure the catheter in the bladder. The balloon end also has one or more eyelets, openings at the catheter tip that allow for urine drainage. The catheter's exterior (distal) end is connected to a collection bag, a valve or similar device that can be opened and/or closed or removed and/or replaced to allow drainage, or another catheter drainage device.

Some studies have indicated a higher incidence of catheter-associated UTI (CAUTI) for urine collection bag users compared to catheter valve users. CAUTIs are a significant healthcare issue that dramatically affects healthcare expenses and patient quality of life. CAUTIs are infections of the urinary tract precipitated by catheter use. Several of these studies have posited that the benefit of using a valve, plug, or cap instead of a drainage bag is related to an increased flow rate of urine when the valve is opened periodically at naturally occurring intervals. These studies are limited in nature because many indwelling catheter users are unable to use catheter valves due to limited bladder sensation or dexterity. This precludes patients from testing the effects of such technologies because they cannot know when to open the valve and drain their bladder.

In the subset of patients that can choose between a collection bag or catheter valve with an indwelling catheter, nearly three-quarters of patients prefer using the valve. A valve is more discreet, offers greater mobility, and improves the overall quality of life for a patient. Additionally, the valve prevents further defunctionalization and shrinkage of the bladder that would typically occur while using a collection bag. Although immediate patient benefits result from the valve's smaller form and inconspicuous nature, the major physiological benefits stem from maintaining the physiological process of filling and voiding the bladder.

Intermittent catheterization is an alternative to indwelling catheterization. A patient or caretaker would insert an intermittent catheter when the patient's bladder fills, or at specified time intervals if they have an insufficient sensation to empty their bladder. This alternative has become popular due to its ability to mitigate catheter-associated UTIs. Intermittent catheterization can be difficult for individuals with mobility or dexterity issues. In a prospective study, a system including an indwelling catheter and catheter valve was offered as an alternative to intermittent catheterization for a period of up to 8 hours per day. The study showed preliminary data that using indwelling catheters with a valve for a period of time each day may improve quality of life without substantially increasing CAUTI risk compared to intermittent catheterization. The study also showed that more than half of the individuals in the study preferred indwelling catheters with a valve.

Emptying one's bladder at specified intervals can fail to account for variations in fluid intake or output, such as those variations resulting from drinking water or sweating while exercising. This can create scenarios where the bladder is emptied more or less frequently than required.

Therefore, there is a long-felt but unresolved need for a system or method that allows patients with limited bladder sensation to use a catheter valve, plug, cap, or similar device to empty their bladder at an appropriate interval and receive the same benefits as an individual with sensation in their bladder.

BRIEF SUMMARY OF THE DISCLOSURE

Briefly described, and according to one embodiment, aspects of the present disclosure generally relate to systems and methods for detecting bladder fullness for patients using a catheter system.

In at least one embodiment, the present system includes a urinary catheter attachment that may be used in-line with indwelling urinary catheters, such as urethral catheters and suprapubic catheters, and urinary catheter accessories, including catheter valves and catheter drainage valves. In particular embodiments, the disclosed system is capable of detecting when the user's bladder is reaching capacity and then alerts the user or caretakers to void their bladder. In at least one embodiment, the disclosed system includes a component that allows for connection to existing catheter tubing ends, a component that allows for connection to existing catheter accessory devices, one or more components that together are capable of detecting and interpreting bladder signals, and a component that generates and delivers alerts based on those signals.

This technology could be beneficial for patients who experience other issues, such as with compliance or mobility. For example, it could be of particular benefit to indwelling catheter users who are unable to remember exactly when to void their bladder. This system can also benefit intermittent catheter users who struggle to transfer to a toilet or have memory issues around their bladder voiding cycle. This proposed technology could also be useful for clinicians who need consistent and reliable data on their patient's bladder dynamics to monitor and improve treatments. The system and approach outlined herein may have future applications to the field of ambulatory urodynamics.

According to a first aspect, a urinary catheter system comprising: A) a back element for receiving a catheter and defining: 1) a back aperture with a first diameter; 2) a joining edge aperture with a second diameter; and 3) a core aperture within a hollow interior, wherein the core aperture comprises the second diameter, wherein the back element comprises: i) the hollow interior extending from the back aperture to the joining edge aperture; ii) an exterior surface; and iii) a joining edge extending from the exterior surface proximate the joining edge aperture; B) a front element defining a front aperture and an interior aperture, the front element interfaces with the back element proximate the interior aperture and comprising: 1) a front hollow interior between the front aperture and the interior aperture; 2) a port between the front aperture and the interior aperture and at least two centimeters from the front aperture, the port for receiving a measurement housing component; and 3) a constant diameter between the interior aperture and the port; and C) the measurement housing component operatively connected to the front element and comprising: 1) one or more transducers for measuring hydrostatic pressure data within the front hollow interior; and 2) at least one transmitter for transmitting the hydrostatic pressure data to a computing system for calculating a bladder fullness level.

According to a further aspect, the urinary catheter system of the first aspect or any other aspect, wherein: A) the joining edge comprises a joint edge exterior surface; and B) a diameter of the joining edge at the joint edge exterior surface is greater than the constant diameter of the front hollow interior.

According to a further aspect, the urinary catheter system of the first aspect or any other aspect, wherein the measurement housing component extends through an exterior wall of the front element to the front hollow interior via the port.

According to a further aspect, the urinary catheter system of the first aspect or any other aspect, wherein the one or more transducers measures hydrostatic pressure of urine within the front hollow interior.

According to a further aspect, the urinary catheter system of the first aspect or any other aspect, wherein the bladder fullness level is calculated by comparing the hydrostatic pressure data to a threshold.

According to a further aspect, the urinary catheter system of the first aspect or any other aspect, wherein the bladder fullness level is computed based on filtered hydrostatic pressure data.

According to a further aspect, the urinary catheter system of the first aspect or any other aspect, wherein upon determining that the bladder fullness level has reached a particular threshold, the computing system is configured to send an alert to a user device.

According to a further aspect, the urinary catheter system of the first aspect or any other aspect, wherein the constant diameter of the front hollow interior is not less than the second diameter of the joining edge aperture.

According to a further aspect, the urinary catheter system of the first aspect or any other aspect, wherein the second diameter is greater than the first diameter.

According to a further aspect, the urinary catheter system of the first aspect or any other aspect, wherein: A) the second diameter is equal to the first diameter; and B) an exterior diameter of the back element tapers downwardly to the back aperture.

According to a second aspect, a process comprising: A) receiving at one or more processors, hydrostatic pressure data associated with an amount of urine in a urinary catheter system derived from one or more transducers via a port through an exterior wall of a catheter attachment component; B) calculating a bladder fullness level based on the hydrostatic pressure data; C) comparing the bladder fullness level to a predetermined threshold; and D) upon determining that the bladder fullness level exceeds the predetermined threshold, transmitting an alert to a user device.

According to a further aspect, the process of the second aspect or any other aspect, wherein the predetermined threshold is specific to a user.

According to a further aspect, the process of the second aspect or any other aspect, wherein calculating the bladder fullness level comprises filtering the hydrostatic pressure data.

According to a further aspect, the process of the second aspect or any other aspect, wherein: A) the hydrostatic pressure data comprises a hydrostatic pressure parameter; and B) calculating the bladder fullness level comprises comparing the hydrostatic pressure parameter to historical hydrostatic pressure data associated with various bladder fullness levels.

According to a further aspect, the process of the second aspect or any other aspect, wherein the one or more transducers are housed within a measurement housing component operatively connected to the catheter attachment component via the port.

According to a further aspect, the process of the second aspect or any other aspect, wherein: A) the catheter attachment component comprises a back element and a front element; B) the front element comprises the port; and C) the measurement housing component is operatively connected to the front element via the port.

According to a further aspect, the process of the second aspect or any other aspect, wherein the back element and the front element are integrally formed.

According to a further aspect, the process of the second aspect or any other aspect, wherein the back element comprises at least two different internal diameters.

According to a further aspect, the process of the second aspect or any other aspect, wherein the back element is configured for at least partial insertion into a urinary catheter.

According to a further aspect, the process of the second aspect or any other aspect, wherein the front element is configured for operative connection to a catheter end accessory.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
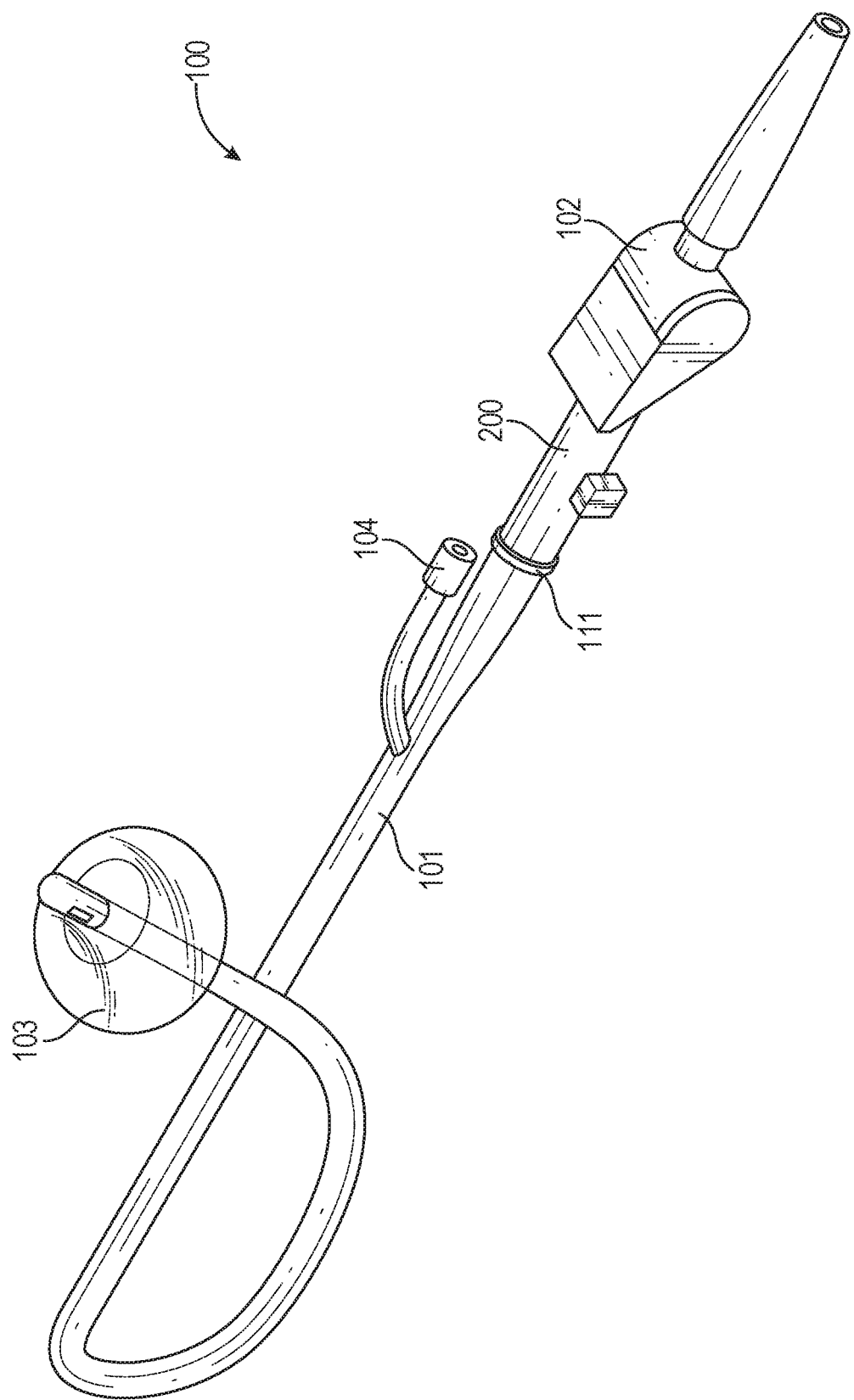
FIG. 1 illustrates a perspective view of the bladder fullness detection system, according to one embodiment of the present disclosure.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Overview

Aspects of the present disclosure generally relate to systems and methods for determining the bladder fullness of a patient using a catheter system. In at least one embodiment, the presently disclosed system includes a urinary catheter attachment that may be used in-line with urinary catheters, such as urethral catheters and suprapubic catheters, and urinary catheter accessories, including catheter valves and catheter drainage valves. In particular embodiments, the disclosed system is capable of detecting when a user's bladder is reaching capacity and then alerts the user or caregiver to void their bladder. In at least one embodiment, the disclosed system includes a component that allows for connection to existing catheter tubing ends, a component that allows for connection to existing catheter accessory devices, one or more components that are capable of detecting, recording, and interpreting bladder signals, a component that generates and delivers alerts based on those signals, and a component that allows the user, and others they have identified, to view and interact with bladder signal and interpretation reports.

In particular embodiments, the disclosed system includes a single sensor (e.g., pressure sensor) or an array of sensors (e.g., pressure, flow, and conductance sensors) that measure the physiological properties of the urine and bladder dynamics. In some embodiments, the data from the sensors are used in an algorithm to determine when to empty an individual's bladder. In particular embodiments, the algorithm types include a simple threshold or more complex data processing models (e.g., regression models, machine learning, or artificial intelligence). In various embodiments, the data processing takes place on a measurement device, a client device, a dedicated computing environment, and/or a combination of the previous computing sources. In at least one embodiment, the data gathered by the disclosed system is monitored, recorded, and transmitted to a suitable data storage component. In various embodiments, the data storage component can reside in the measurement device, client device, and/or the dedicated computing environment. In one or more embodiments, the data produced by the disclosed system is analyzed by those involved in the user's medical care (e.g., the user, the user's caretaker, or the user's medical team). In some embodiments, the disclosed system analyzes stored data to construct clinically relevant reports, such as bladder diaries detailing how often and how much the patient voids their bladder, plots of the bladder's changes in pressure or compliance over short or long time periods, and/or any other pertinent reports. In one or more embodiments, the disclosed system connects to the catheter and performs its function noninvasively to the user.

In various embodiments, a data processing system, a notification system, a data storage system, or a combination of these systems, are located on one or a combination of a measurement device, wearable devices, client devices (e.g., phone or tablet), local computing environments, and/or cloud computing environments. In some embodiments, the disclosed system may provide multiple notifications to ensure the user voids their bladder at an appropriate time. In various embodiments, the disclosed system provides an early notification to ensure users have sufficient time to find a suitable location to empty their bladder. In particular embodiments, the disclosed system provides an early notification to help users that need more time to find an adequate voiding location due to conditions such as mobility impairments. In at least one embodiment, the disclosed system is programmed to gradually increase the duration, or bladder fullness, between voiding intervals to "train" and potentially expand the bladder. In one or more embodiments, an expanded bladder, increased time intervals between voidances, and/or an increased bladder fullness increases bladder capacity over time. In various embodiments, the disclosed system considers user-specific parameters measured, or input manually through an interface, to optimize the system to the particular user. In at least one embodiment, the disclosed system includes steps to account for artifacts in data collected. In one or more embodiments, the steps for artifact recognition may include implementing high or low pass filters or other models to resolve data to its relevant information.

Exemplary Embodiments

Referring now to the figures, for the purposes of example and explanation of the fundamental processes and components of the disclosed systems and processes, reference is made to FIG. 1, which illustrates a perspective view of the catheter system 100. As will be understood and appreciated, the exemplary catheter system 100 shown in FIG. 1 represents merely one approach or embodiment of the present system, and other aspects are used according to various embodiments of the present system. In some embodiments, the exemplary catheter system 100 includes a catheter tube 101, a balloon 103, a balloon port 104, a catheter valve 102, and a bladder fullness detection system 200. In one or more embodiments, the catheter tube 101 includes various lumens (not pictured), which are particular channels for liquid flow. For example, there may be a lumen dedicated for urine flow and a distinct lumen for saline flow to the balloon 103.

As will be understood from discussions herein, the system may include any suitable catheter end accessory. A catheter end accessory may be any device, system, and/or component that is operatively placed at the end of a conventional catheter. In at least one embodiment, the catheter end accessory may be a drainage bag, a catheter valve 102, a plug, or other catheter drainage accessories.

In various embodiments, the balloon 103 anchors to a bladder by filling and expanding with a saline solution. In some embodiments, anchoring the balloon 103 prevents the catheter tube 101 from sliding out of the body. In particular embodiments, the catheter tube 101 is inserted into the bladder before inflating the balloon 103. In various embodiments, the balloon 103 inflates as a syringe inputs fluid through the balloon port 104, which connects to the balloon 103 through a lumen. In some embodiments, following the catheter tube 101 insertion into the bladder and balloon inflation, another lumen of the catheter tube 101 connects to bladder fullness detection system 200. In one or more embodiments, the lumen uses an externally visible interface at a joining edge 111 to connect with the bladder fullness detection system 200.

In particular embodiments, the joining edge 111 is a physical ridge on the bladder fullness detection system 200. In one or more embodiments, the joining edge 111 acts as a stop, keeping the bladder fullness detection system 200 from advancing any further into the catheter tube 101 during installation or use. The catheter tube 101 may connect to the bladder fullness detection system 200 by sliding the two components together until the catheter tube 101 touches the joining edge 111. In particular embodiments, once catheter tube 101 is connected to bladder fullness detection system 200, the catheter valve 102 connects to the bladder fullness detection system 200.

In some embodiments, the components are connected by first connecting the bladder fullness detection system 200 to the catheter valve 102. Continuing with this embodiment, the bladder fullness detection system 200 attaches to the catheter tube 101 once catheter tube 101 is inserted into the bladder and secured using the catheter balloon 103.

In some embodiments, the bladder fullness detection system 200 operates outside of the bladder. In various embodiments, the bladder fullness detection system 200 is distinct from a system that measures and operates inside the bladder.

In particular embodiments, the catheter valve 102 is manually or automatically opened and closed to allow urine discharge and stop urine outflow, respectively. In one or more embodiments, when the catheter valve 102 is in an opened state, the catheter valve 102 discharges urine. In some embodiments, the catheter valve 102 closes when the bladder is emptied to prevent urine outflow. In various embodiments, the catheter valve 102 is mechanically controlled by the measurement device 606 (see FIG. 6) to automatically discharge urine or prevent urine outflow.

In particular embodiments, a hydrostatic pressure column is created when the catheter valve 102 is closed. In at least one embodiment, the hydrostatic pressure column is continuous through the catheter valve 102, the bladder fullness detection system 200, the catheter tube 101, and the user's bladder. In certain embodiments, the hydrostatic pressure column does not have any discontinuities throughout the components stated herein. In one or more embodiments, a continuous hydrostatic pressure column throughout the catheter system 100 facilitates detecting or calculating parameters such as fluid height above the measurement point. In various embodiments, when the height of fluid above the measurement point is known, the bladder fullness detection system 200 can determine the height of fluid in the bladder. In particular embodiments, the bladder fullness detection system 200 electronically detects the hydrostatic pressure and calculates the height of fluid above it to determine the bladder's level of fullness. In various embodiments, the sensor array may measure other pertinent parameters when the catheter valve 102 is open or closed (e.g., urine flow rates, electrolyte concentrations, the presence of bacteria, whether the catheter valve is opened or closed, etc.).

In some embodiments, the bladder fullness detection system 200 measures and analyzes pertinent parameters within the bladder fullness detection system 200 and/or on a system architecture 600. In one or more embodiments, the bladder fullness detection system 200 may be disposable, reusable, or contain components that are a combination of reusable and disposable.

Figure 2:
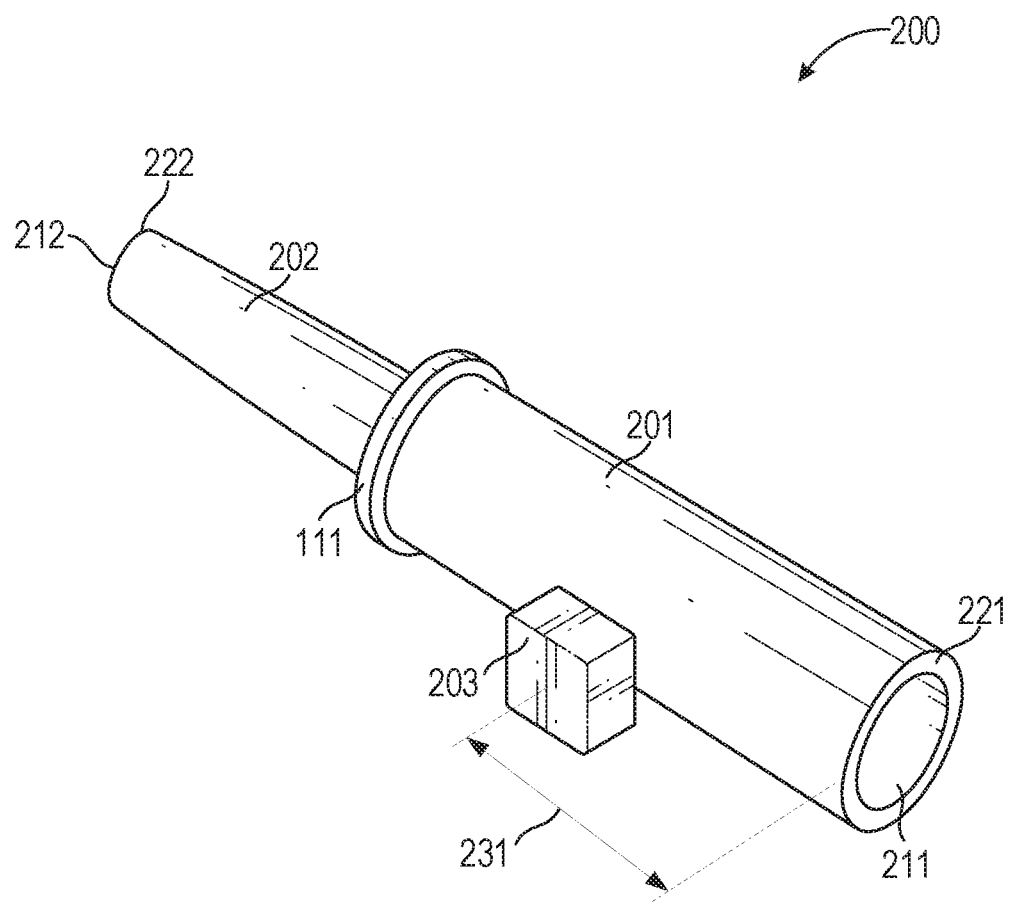
FIG. 2 illustrates a perspective view of the bladder fullness detection system, according to one embodiment of the present disclosure.

Referring now to FIG. 2, illustrated is a perspective view of the bladder fullness detection system 200. In one or more embodiments, the bladder fullness detection system 200 includes a back hollow element 202, a front hollow element 201, and a measurement component housing 203. In various embodiments, the back hollow element 202, the front hollow element 201, and the measurement component housing 203 are made of similar materials.

In some embodiments, the back hollow element 202, the front hollow element 201, and the measurement component housing 203 are made of dissimilar materials. The bladder fullness detection system may include, but is not limited to, latex, silicone, polypropylene, polyethylene, and polycarbonates. In particular embodiments, the components of the bladder fullness detection system are manufactured using 3D printing, rotational molding, injection molding, cast molding, thermoforming, and/or any other suitable manufacturing process. In various embodiments, any combination of components are manufactured as one component or a plurality of components. In at least one embodiment, the back hollow element 202 and the front hollow element 201 are a single piece (e.g., are integrally formed).

In some embodiments, the back hollow element 202 inserts into the distal end of the catheter tube 101 (e.g., receives the catheter tube 101). In at least one embodiment, the back hollow element 202 and the catheter tube 101 have substantially similar diameters. In particular embodiments, having a substantially similar diameter between the back hollow element 202 and the catheter tube 101 promotes an adequate seal. In some embodiments, the back hollow element 202 has a larger diameter than the catheter tube 101. In various embodiments, the back hollow element 202 is made of a high friction material to promote sealing between the back hollow element 202 and the catheter tube 101. According to particular embodiments, a surface of the back hollow element 202 includes one or more ridges, spines, or other surface features for promoting friction between the back hollow element 202 and catheter tube 101 (when catheter tube 101 is operatively connected to the back hollow element 202).

In one or more embodiments, the back hollow element 202 includes a back edge 222 and a back aperture 212. In at least one embodiment, the back aperture 212 operates as an opening for the inflow of urine from the catheter 101.

In some embodiments, the front hollow element 201 connects to a catheter valve 102 and/or a particular catheter attachment system. In various embodiments, the front hollow element 201 has a diameter similar to that of the distal end of a catheter valve 102. The mechanical seal between the front hollow element 201 and the catheter valve 102 may be substantially similar to the mechanical seal between the back hollow element 202 and the catheter tube 101.

In some embodiments, the mechanical seals between the front hollow element 201 and the catheter valve 102 may include clamping, gluing, chemical sealing, friction-based sealing, threaded sealing, and/or any other suitable sealing technique. In at least one embodiment, the front hollow element 201 and the catheter valve 102 may be integrally formed. As will be understood from discussions herein, the front hollow element 201 may be integrally formed with a catheter end accessory (including a catheter valve 102 or other accessory) and/or the back element 202.

In some embodiments, back hollow element 202 includes a joining edge 111. In various embodiments, the joining edge 111 has a greater diameter than the back hollow element 202, equal to an interior or exterior diameter of the catheter tube 101. In at least one embodiment, the joining edge 111 functions as a stop to ensure the back hollow element 202 is inserted into the catheter tube 101 by a sufficient amount. In particular embodiments, the joining edge 111 provides surface area during manufacturing and assembly for joining various components. The front hollow element 201 and back hollow element 202 may have an internal diameter similar to the catheter tube 101 to facilitate similar drainage rates throughout the system.

In one or more embodiments, the front hollow element 201 includes a front edge 221 and a front aperture 211. The front aperture 211 of the front hollow element 201 receives a catheter valve 102. In particular embodiments, the front edge 221 remains outside a catheter valve 102, or similar device, inserted into the front hollow element 201. In some embodiments, the back edge 222 remains inside the catheter tube 101 when the back hollow element 202 and the catheter tube 101 are connected.

In one or more embodiments, the measurement component housing 203 includes a single or array of transducers (e.g., pressure, light, conductance) that protrude from the measurement component housing 203 and connect via a port 501 (see FIG. 5) on the lateral side of the front hollow element 201. In some embodiments, the measurement component housing 203 also includes a transmitter to relay information between the system architecture 600 components (see FIG. 6). In various embodiments, the measurement component housing may be located at least about 2.0 cm, 3.0 cm, 2.0-5.0 cm, 3.0-4.0 cm, 4.0-5.0 cm, or less than about 5.0 cm from the front aperture 211, as indicated by length 231. As will be understood from discussions herein, the length 231 may extend from the front aperture 211 to a central portion of the measurement component housing and/or port 501 (shown in FIG. 5). In various embodiments, the length 231 allows for the complete insertion of drainage accessories without covering the insertion port. In some embodiments, the measurement component housing 203 is removable and reusable with new bladder fullness detection system 200 components. The measurement component 203 may also contain a microcontroller, battery, and Bluetooth transmitter, and/or other wireless transmitters.

Figure 3A:
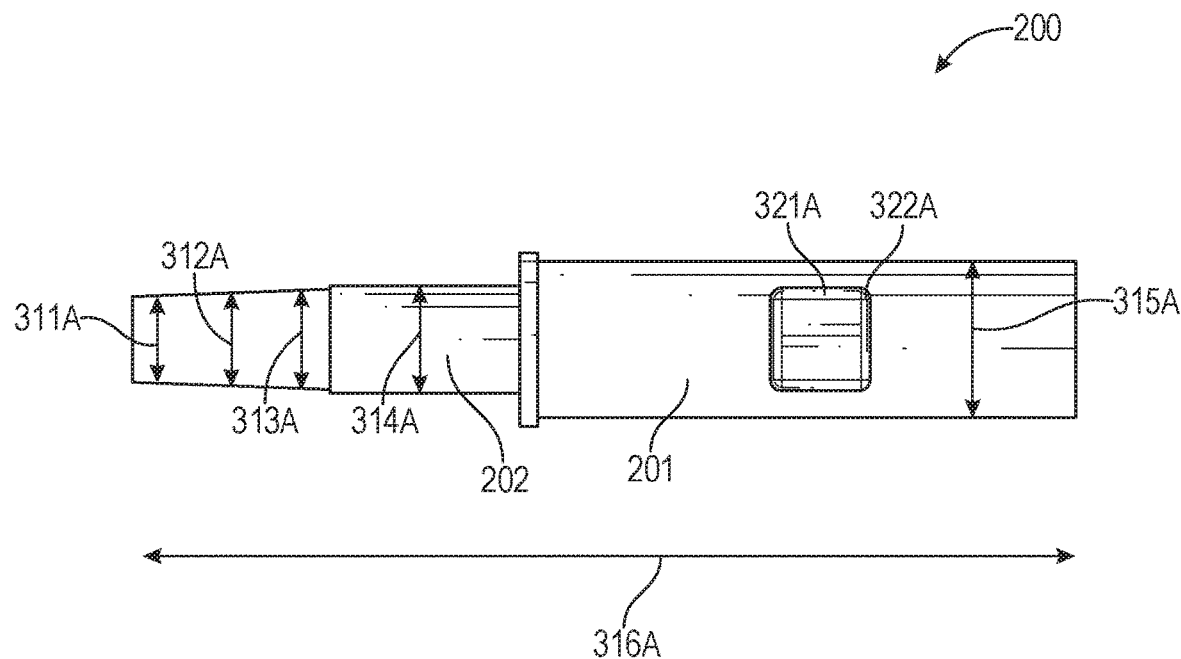
FIG. 3A illustrates a first side view of the bladder fullness detection system, according to one embodiment of the present disclosure.

Referring now to FIG. 3A, illustrated is a first side view of the bladder fullness detection system 200, according to one embodiment of the present disclosure. In at least one embodiment, the bladder fullness detection system 200 includes the back hollow element 202 that starts at a small diameter and gradually increases to its maximum diameter approximately halfway between the back edge 222 and the joining edge 111. In particular embodiment, a first diameter 311A may measure at least about 2.0 mm, 2.0-5.0 mm, 2.0-3.0 mm, 3.0 mm, 3.0-4.0 mm, 4.0-5.0 mm, or less than about 5.0 mm. In some embodiments, a second diameter 312A may measure at least about 5.0 mm, 5.0-9.0 mm, 5.0-6.0 mm, 6.0 mm, 6.0-7.0 mm, 7.0-8.0 mm, 8.0-9.0 mm, or less than about 9.0 mm. In various embodiments, a third diameter 313A may measure at least about 8.0 mm, 8.0-13.0 mm, 8.0-9.0 mm, 9.0-10.0 mm, 10.0-11.0 mm, 11.0-12.0 mm, 12.0 mm, 12.0-13.0 mm, or less than about 13.0 mm. In one or more embodiments, the second diameter 312A is located about halfway between the first diameter 311A and the third diameter 313A. In some embodiments, the second diameter 312A has a diameter greater than the first diameter 311A but less than the third diameter 313A. In various embodiments, the second half of the back hollow element 202 includes a fourth diameter 314A. In particular embodiment, the fourth diameter 314A size is substantially similar to the third diameter 313A size. In one or more embodiments, the back hollow element 202 increases in diameter from the first diameter 311A to the third diameter 313A to create a seal between the back hollow element 202 and the catheter tube 101. The back hollow element 202 may have a silicone or latex layer externally to promote a greater seal with the catheter tube 101.

In some embodiments, a length 316A measures at least about 8.0 cm, 8.0-12.0 cm, 8.0-10.0 cm, 10.0 cm, 10.0-12.0 cm, or less than about 12.0 cm. In one or more embodiments, the length 316A varies but may be substantial enough to promote measurements via the measurement device 606 (see FIG. 6) when the catheter valve 102 (or other catheter end accessory) and the catheter tube 101 are attached.

In some embodiments, a front element diameter 315A may measure at least about 10.0 mm, 10.0-11.0 mm, 10.0-10.5 mm, 10.5-11.0 mm, or less than about 11.0 mm. In various embodiments, the front element diameter 315A fits standard urinary catheter end accessories. The front hollow element 201 may have a silicone or latex layer internally to promote a greater seal with urinary catheter end accessories. In at least one embodiment, the front hollow element 201 has one or more internal diameters that taper to enable a secure fit with urinary catheter end accessories.

The measurement component housing 203 may include a housing edge 321A and a housing corner 322A. In at least one or more embodiments, the housing corner 322A and the housing edge 321A are rounded to prevent snagging on clothes or accessories and prevent irritation. In various embodiments, the measurement component housing 203 is manufactured in multiple parts, such as, for example, with seams between the component housing body, the housing edge 321A, and the housing corners 322A. In some embodiments, the measurement component housing 203 is manufactured as one complete part.

Figure 3B:
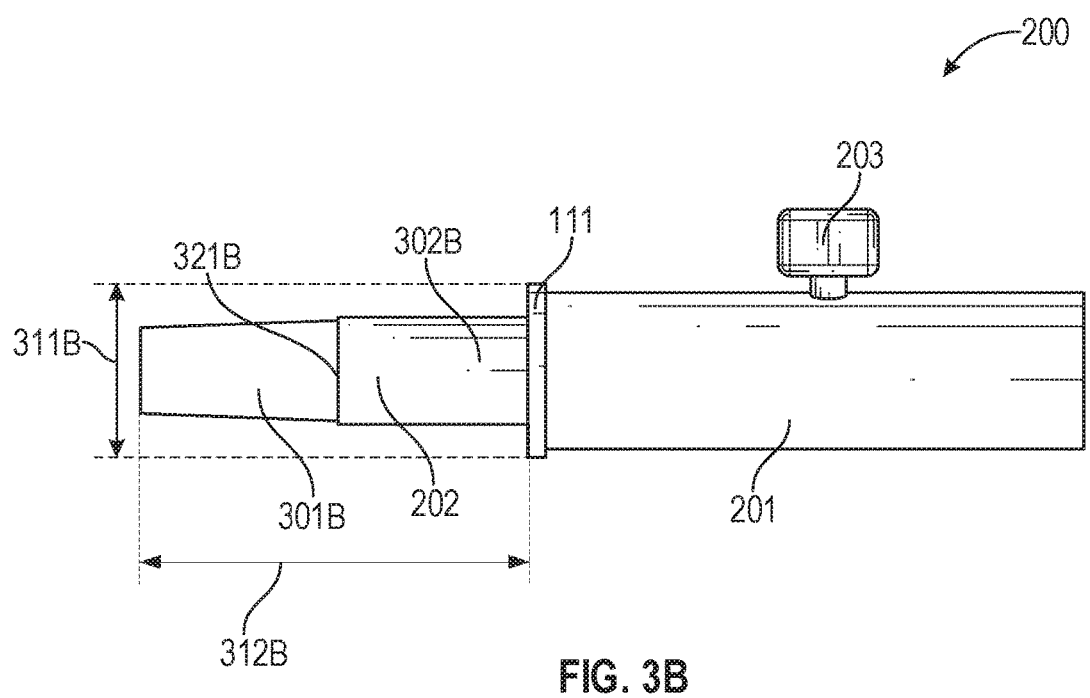
FIG. 3B illustrates a second side view of the bladder fullness detection system, according to one embodiment of the present disclosure.

Referring now to FIG. 3B, illustrated is a second side view of the bladder fullness detection system 200, according to one embodiment of the present disclosure. In certain embodiments, the device has a back hollow element 202 that interfaces and fits into the exposed portion of a urinary catheter. In various embodiments, a front hollow element 201 may be adhered to or attached to the back hollow element 202. In some embodiments, the back hollow element 202 and the front hollow element 201 are made using a combination of elastic materials (e.g., rubber or latex) and rigid materials (e.g., plastics). In at least one embodiment, the front hollow element 201, the back hollow element 202, and the joining edge 111 are manufactured as a single piece (e.g., are integrally formed). In one or more embodiments, the measurement component housing 203 attaches to the front hollow element 201.

In certain embodiments, the back hollow element 202 of the bladder fullness measurement system 200 has two portions. In some embodiments, a first hollow element half 301B gradually increases in diameter from the back edge 222 to a back hollow element joint 321B. In particular embodiments, the back hollow element joint 321B has a substantially similar diameter as the fourth diameter 314A (see FIG. 3A). In some embodiments, the first hollow element half 301B appends to a second hollow element half 302B. In various embodiments, the first hollow element half 301B extends from the first diameter 311A to the third diameter 313A. In at least one embodiment, the third diameter 313A transitions to the fourth diameter 314A of the second hollow element half 302B. In one or more embodiments, the second hollow element half 302B has a consistent diameter equivalent to the fourth diameter 314A.

In some embodiments, the gradually increasing slope of the first hollow element half 301B facilitates a connection between the back hollow element 202 and the catheter tube 101. In various embodiments, the back hollow element 202 measures a length 312B that is at least about 3.0 cm, 3.0-4.0 cm, or less than about 4.0 cm. In particular embodiments, the length 312B varies to improve the fit with different types of catheters. The first diameter 311A, second diameter 312A, third diameter 313A, and fourth diameter 314A may vary to improve the fit with select catheters.

The joining edge 111 may function as a stop to prevent over-insertion of the bladder fullness detection system 200 into the catheter tube 101. A joining edge diameter 311B may be greater than the fourth diameter 314A on the back hollow element 202 by at least an amount approximately equal to the thickness of the catheter tube 101. In certain embodiments, the joining edge diameter 311B is larger than the inner diameter of the catheter tube 101 but smaller than the outer diameter of the catheter tube 101.

In some embodiments, the connection between the first hollow element half 301B and the second hollow element half 302B is defined as the back hollow element joint 321B.

In particular embodiments, the back hollow element 202 is manufactured as one or multiple components and later joined at the back hollow element joint 321B. In some embodiments, the back hollow element 202 is manufactured as one complete component. In various embodiments, the back hollow element joint 321B diameter is substantially similar to the fourth diameter 314A of the back hollow element 202. In at least one embodiment, the back hollow element joint 321B is smooth and unnoticeable aside from marking the transition region from the first hollow element half 301B to a second hollow element half 302B.

Figure 4A:
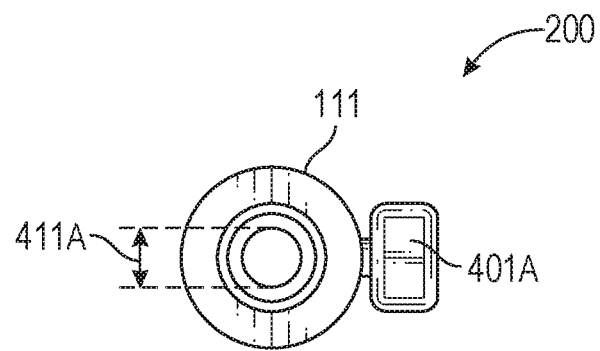
FIG. 4A illustrates a top view of the bladder fullness detection system, according to one embodiment of the present disclosure.

Referring now to FIG. 4A, illustrated is a top view of the bladder fullness detection system 200, according to one embodiment of the present disclosure. In various embodiments, the measurement component housing 203 has an outer shell 401A made of a soft medical grade material, protecting the measurement device 606 (see FIG. 6) inside and providing comfort to the wearer. An interior back diameter 411A is defined as the difference between the first diameter 311A and the material thickness of the back hollow element 202. In some embodiments, the interior back diameter 411A measures at least about 2.0 mm, 2.0-8.0 mm, 2.0-4.0 mm, 4.0-6.0 mm, 6.0-8.0 mm, or less than about 8.0 mm.

Figure 4B:
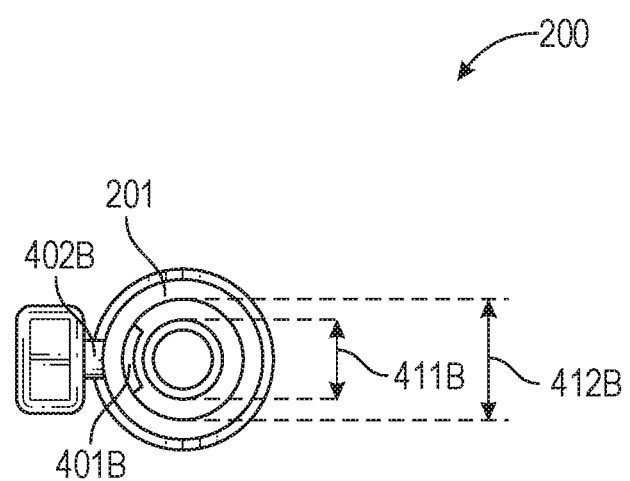
FIG. 4B illustrates a bottom view of the bladder fullness detection system, according to one embodiment of the present disclosure.

Referring now to FIG. 4B, illustrated is a bottom view of the bladder fullness detection system 200, according to one embodiment of the present disclosure. In at least one embodiment, the measurement component housing 203 is attached to a connection tubing 402B that protrudes perpendicular to the front hollow element 201. In one or more embodiments, the connection tubing 402B facilitates a continuous connection with the fluid column. In particular embodiments, the measurement device 606 (see FIG. 6) measures the pressure present in the connection tubing 402B. In some embodiments, the anchoring element 401B conforms to a front inner diameter 412B of the front hollow element 201. In various embodiments, an interior diameter 411B is substantially similar to the fourth diameter 314A of the back hollow element 202. The front inner diameter 412B may measure the difference between the back hollow element diameter 315A and the material thickness of the front hollow element 201. The front inner diameter 412B may measure at least about 10.0 mm, 10.0-11.0 mm, or less than about 11.0 mm to accommodate most catheter valves or other catheter end accessories.

The connection tubing 402B for the measurement component housing 203 may have a diameter of at least about 0.5 mm, 0.5-5.0 mm, 0.5-2.5 mm, 2.5-5.0 mm, or less than about 5.0 mm. In various embodiments, the diameter of the connection tubing 402B approaches the size of the transducer it contains. In at least one embodiment, the connection tubing 402B diameter is determined for improving accessibility to users that may work with the measurement component housing 203. In at least one embodiment, the anchoring element 401B may have a diameter measuring at least about 5.0 mm, 5.0-6.0 mm, or less than about 6.0 mm. In various embodiments, the anchoring element 401B diameter is chosen to facilitate anchoring of the measurement component housing 203 to the front hollow element 201 without exceeding the internal diameter 412B.

Figure 5:
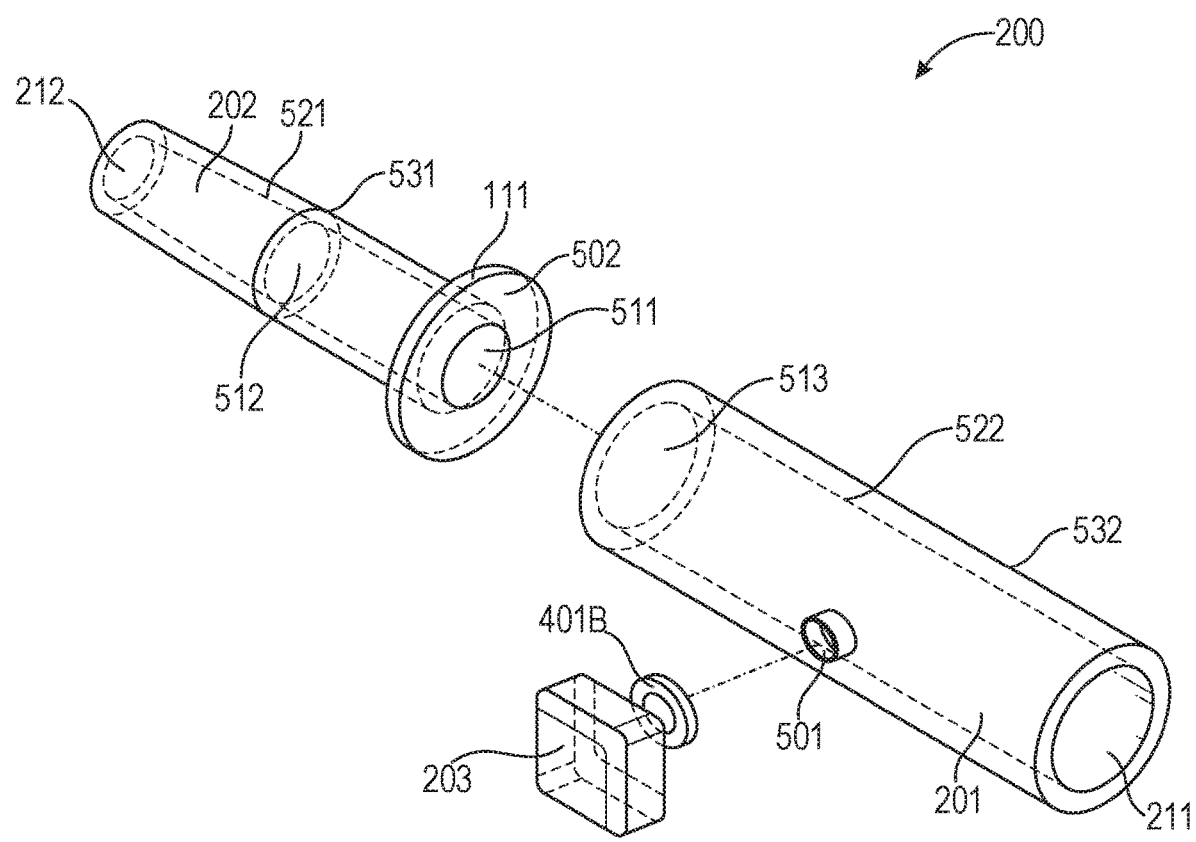
FIG. 5 illustrates an exploded view of the bladder fullness detection system, according to one embodiment of the present disclosure.

Referring now to FIG. 5, illustrated is an exploded isometric view of the bladder fullness detection system 200, according to one embodiment of the present disclosure. In various embodiments, the back hollow element 202 has a back aperture 212 that allows fluid to flow from the urinary catheter. In some embodiments, the back hollow element 202 has a drafted tip 521 that allows for easy insertion into the distal hollow end of a urinary catheter. The back hollow element 202 may have the joining edge 111 at the base to prevent catheter tube 101 from being advanced any further. In some embodiments, the joining edge 111 and its joining edge diameter 311B (see FIG. 3B) have varying dimensions to accommodate various catheters. In particular embodiments, the front hollow element 201 meets the back hollow element 202 at the joining edge 111. In various embodiments, the front hollow element 201 has port 501, where the measurement component housing 203 fastens. In at least one embodiment, the measurement component housing 203 includes the anchoring element 401B that maintains the measurement component housing 203 secured to the front hollow element 201. In some embodiments, the anchoring element 401B is removable from the front hollow element 201. In one example, fluid enters the device through the back aperture 212 of the back hollow element 202 and exits through the front aperture 211 of the front hollow element 201. In particular embodiments, the end of front aperture 211 has the inner diameter 412B (see FIG. 4B) that can fit standard catheter end accessories.

In various embodiments, a front element interior surface 522 tapers to allow for easy catheter end accessory insertion. In one or more embodiments, the front element interior surface 522 increases in diameter from the front aperture 211 to a front element interior aperture 513 or to another location, such as to the port 501. For example, the diameter of the front aperture 211 is smaller than the diameter of the front element interior aperture 513. In some embodiments, the front element interior surface 522 decreases in diameter from the front aperture 211 to the front element interior aperture 513 (or to the port 501). For example, the diameter of the interior portion of the front aperture 211 is larger than the diameter of the interior portion of the front element interior aperture 513. In at least one embodiment, the front element interior surface 522 has a constant diameter. In particular embodiments, the diameter of the front element exterior surface 532 has a constant diameter. In various embodiments, the front element interior surface 522 employs a combination of constant, and/or tapered dimensions. In one or more embodiments, the front element exterior surface 532 is substantially similar to the front element interior surface 522 and takes on any dimensions described herein. In various embodiments, the front element exterior surface 532 does not exhibit similar dimensions as the front element interior surface 522. For the foregoing explanation, it is understood that the back hollow element 202 and all of its sub-components may exhibit similar dimensional and/or structural features (e.g., tapered interior and/or exterior surfaces, constant interior and/or exterior surfaces, combination of both tapered and constant surfaces) as the front hollow element 201. In various embodiments, a back element exterior surface 531 tapers gradually to allow for easier insertion and compatibility with varying diameters of catheter tubing 101. In particular embodiments, a core aperture 512 represents the transitional region from a gradually increasing internal diameter to a constant internal diameter. In some embodiments, the tapered internal diameter does not significantly impact the hydrostatic pressure measurements during use. In various embodiments, a joining edge aperture 511 may have the same diameter as the inner diameter 411A. In some embodiments, the internal diameter may be constant through the back hollow element.

A front element interior aperture 513, the front element interior surface 522, and the front aperture 211 may have the same diameter as the inner diameter 412B. The front element exterior surface 532 may have the same diameter as the front hollow element diameter 315A. In various embodiments, the joining edge 111 has an exterior surface 502 that appends or is otherwise connected to the front hollow element 201. In particular embodiments, the front hollow element 201 appends to the exterior surface 502 of the joining edge 111 using glue, heat, chemical welding, and/or any suitable appending process.

Figure 6:
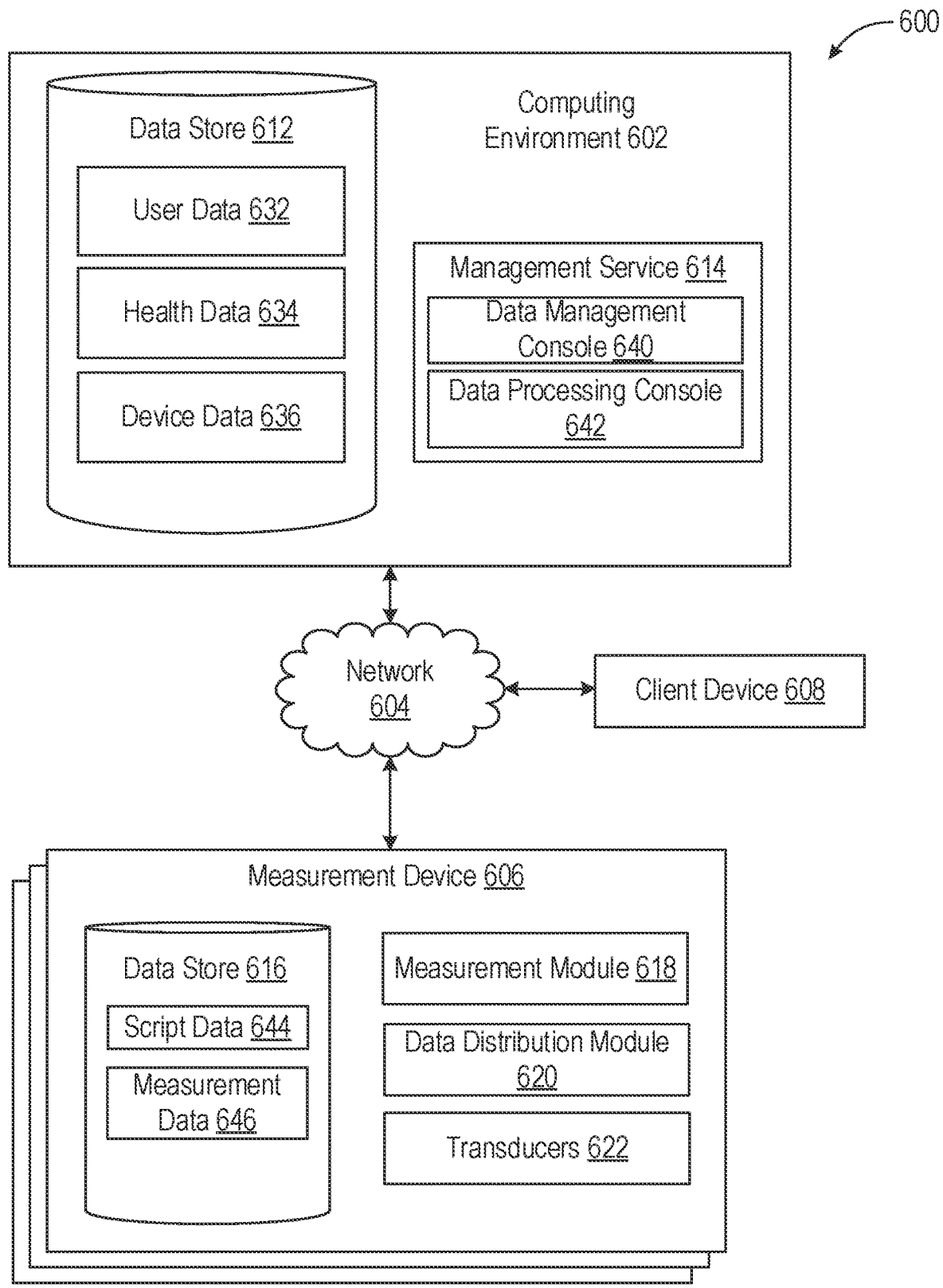
FIG. 6 illustrates a system architecture for the measurement device of the bladder fullness detection system, according to one embodiment of the present disclosure.

Referring now to FIG. 6, illustrated is a system architecture 600 of the bladder fullness detection system 200, according to one embodiment of the present disclosure. In various embodiments, the system architecture 600 includes a computing environment 602, a measurement device 606, and a client device 608, which are in communication with each other via a network 604. The network 604 may include, for example, the Internet, intranets, extranets, wide area networks (WANs), local area networks (LANs), wired networks, wireless networks, or other suitable networks, etc., or any combination of two or more such networks. For example, such networks may include satellite networks, cable networks, Ethernet networks, Bluetooth networks, Wi-Fi networks, NFC networks, and other types of networks.

In various embodiments, the computing environment 602 includes, for example, a server computer or any other system providing computing capability. In an embodiment, the computing environment 602 employs more than one computing device that can be arranged, for example, in one or more server banks or computer banks or other arrangements. Such computing devices may be located in a single installation or may be distributed among many different geographical locations. For example, the computing environment 602 may include one or more computing devices that together may include a hosted computing resource, a grid computing resource, and/or any other distributed computing arrangement. In particular embodiments, the computing environment 602 can correspond to an elastic computing resource where the allotted capacity of processing, network, storage, or other computing-related resources can vary over time.

Various applications and/or other functionality may be executed in the computing environment 602 according to various embodiments. In some embodiments, various data is stored in a data store 612 that is accessible to the computing environment 602. The data store 612 may be representative of one or more of the data stores 612, as can be appreciated. The data stored in the data store 612, for example, may be associated with the operation of the various applications and/or functional entities described below.

The components executed on the computing environment 602, for example, include a list of applications, and other applications, services, processes, systems, engines, or functionality that will be discussed in further detail herein. In some embodiments, the management service 614 includes a data management console 640 and a data processing console 642. In at least one embodiment, the data management console 640 distributes data to the data store 612, the measurement device 606, the client device 608, and/or any other device that requests data for particular functionalities. In various embodiments, the data processing console 642 manages data processing for the disclosed system.

According to one embodiment of the present disclosure, the data processing console 642 processes data gathered by the computing environment 602. In particular embodiments, the data processing console 642 receives recorded data related to an individual's bladder dynamics and emptying patterns to provide medical professionals with improved diagnosis and treatment monitoring. For example, the data processing console 642 may create and send a statistical analysis report of a patient's bladder emptying patterns to a medical professional. In one or more embodiments, the data processing console 642 filters data to its pertinent variables and removes particular artifacts. Artifacts may be defined as inconsistencies in the data. For example, the processing console 642 can institute low pass and/or high pass filters to remove noise and other miscellaneous errors in the data. In some embodiments, the data processing console 642 performs various averaging techniques to the data gathered by the measurement device 606. For example, the data processing system 642 may calculate or compute a moving average on bladder pressure data to determine historical or periodic trends. In at least one embodiment, the data processing console 642 performs machine learning techniques to create predictive models of the user's bladder habits. For example, the data processing console 642 uses machine learning techniques to determine the likelihood that an individual will use the bathroom after a rehabilitation session.

The data store 612 of the computing environment 602 may include user data 632, health data 634, device data 636, managed device data 635, and/or any other data store pertinent to the system. In some embodiments, the data store 612 is local to all components of the system architecture 600. In various embodiments, the data store 612 is stored remotely and accessible through the network 604. In one or more embodiments, the data store 612 is accessible remotely through the network 604.

In various embodiments, the user data 632 includes all data that relates to the user. In particular embodiments, the user data 632 includes name, age, date of birth, caregiver information, emergency contact information, home address, email, password, and/or any other relevant data to the user. In at least one embodiment, the user data 632 acts as the head of a linked list of data, where all information pertinent to the user references back to their particular user data 632. For example, the device data 636 or a particular user links back to the user's user data 632.

In some embodiments, the health data 634 includes all health-related information of a particular user. The health data 634 may include, but is not limited to, bladder threshold data, medical history, medical data, size, weight, and health care provider information. In various embodiments, the health data 634 stores data related to the personalized bladder threshold. In some embodiments, the client device 608 requests and receives bladder threshold data from a user or their corresponding medical professional. In one or more embodiments, the data processing console 642 measures bladder fullness relative to the personalized bladder threshold data.

In at least one embodiment, the device data 636 includes all data transmitted, gathered, produced, or otherwise stored on the measurement device 606 and/or the client device 608. The device data 636 may include, but is not limited to, system health data, system diagnostics, hydrostatic pressure data, and bladder health data.

In some embodiments, the measurement device 606 records and processes data measured from the bladder fullness detection system 200. In various embodiments, the measurement device 606 is stored in the measurement component housing 203 (see FIG. 2). In particular embodiments, the measurement device 606 includes a data store 616, a measurement module 618, a data distribution module 620, and transducers 622. In various embodiments, the measurement device 606 is wirelessly or wire chargeable. In alternative embodiments, the measurement device 606 is disposable, with a finite battery lifetime.

In some embodiments, the data store 616 of the measurement device 606 stores and maintains particular data for processing and distribution. In various embodiments, the data store 616 and the data store 612 are substantially similar and share the same information. In some embodiments, the data store 612 and the data store 616 hold distinct data. In at least one embodiment, the data store 612 includes, but is not limited to, script data 644 and measurement data 646.

In various embodiments, the script data 644 includes all programs used to power and function the measurement device 606. In particular embodiments, the script data 644 includes calculation scripts, data acquisition scripts, data transmitting scripts, power sequencing scripts, and/or any other code used to maintain the functionality of the measurement device 606.

In certain embodiments, measurement data 646 includes all measured data from the measurement device 606. In one or more embodiments, the measured data includes hydrostatic pressure data, bacteria data, pressure versus time data, and/or any other measurable data. In various embodiments, the data distribution module 620 accesses the measurement data 646 and shares the data across the network 604. For example, the data distribution module sends bladder pressure data to the computing environment 602.

The measurement module 618 may measure and transmit measurement data to the data store 616. In particular embodiments, the measurement module 618 uses measurement scripts to activate and control particular transducers 622. For example, the measurement module 618 can execute a specific recording script to record bladder fullness data from 9 PM to 7 AM to monitor a user's bladder during sleep. In some embodiments, the measurement module 618 can perform substantially similar actions to the data processing module 642.

The data distribution module 620 may perform data distribution amongst components of the system architecture 600. In particular embodiments, the data distribution module 620 can transfer data from the measurement device 606 to the computing environment 602 and the client device 608. In various embodiments, the data distribution module 620 can transfer data internally to particular locations. For example, the data distribution module 620 may transfer data from the transducers 622 to the measurement module 618 and from the measurement module 618 to the data store 616.

In one or more embodiments, the transducers 622 measure variations in the physical environment and produce electrically readable output data based on these variations. The transducers may include, but are not limited to, pressure sensors, pH sensors, bacteria sensors, flow sensors, conductance sensors, and transmitters. For example, the pressure sensors record the pressure of the liquid in the user's bladder (but, in at least one embodiment, are located outside the user's bladder). Continuing this example, the pressure sensor records information and stores the data in the data store 616. Continuing this example, the data distribution module 620 uses a transmitter to communicate and forward recorded information to the client device 608 and/or the computing environment 602.

In particular embodiments, the processes and functionality of the computing environment 602 are similarly performed by the client device 608 and/or the measurement device 606. There may also be repeated subcomponents of the computing environment 602 in the client device 608 and/or the measurement device 606. For example, the data processing console 642 or the data store 612 may exist on the measurement device 606 to perform actions such as filtering data, smoothing data, determining bladder fullness, or determining how bladder fullness compares to a user's threshold fullness. In another example, the data processing console 642 may also exist on the client device 608 and may perform similar actions as those described herein. In one or more embodiments, the data management console 640 may exist anywhere the data processing console 642 exists to facilitate actions performed by the data processing console 642. In at least one embodiment, the data management console 640 may exist elsewhere, such as alone on the measurement device 606, client device 608, and/or remotely. In particular embodiments, the data management console 640 may also manage data and interface with the data store 612 and a data store 616. In one or more embodiments, the data management console 640 participates in the transfer of data between the data store 612 and the data store 616.

The data store 612 and the data store 616 may overlap partially, entirely, or are mutually exclusive. In various embodiments, data stored in the data store 612, the data store 616, in the cloud, and/or on some other remote or local storage may be accessed, modified, transferred, or deleted by a request sent from a management service 614 or a data distribution module 620. In one or more embodiments, the data may exist temporarily in the measurement module 618 before being stored in the data store 616, stored in the data store 612, processed by the data processing console 642, sent through a data distribution module 620, or discarded.

The client device 608 may receive communication over the network 604 from the computing environment 602 or the measurement device 606. In some embodiments, the client device 608 includes any mobile computing device used to display notifications, change user preferences, and read pertinent information from the bladder fullness detection system 200. In various embodiments, the client device 608 is a smartwatch, a cell phone, a laptop, or any mobile computing system. In one or more embodiments, the client device 608 controls a screen, input systems, data distribution, and/or any standard functionalities of mobile computing systems. In particular embodiments, the client device 608 receives notifications from the computing environment 602 and/or the measurement device 606. For example, the measurement device 606 sends a notification to the client device 608 that it's time to void the user's bladder. Continuing this example, the notification is displayed on the client device 608. In certain embodiments, the client device 608 performs similar functionalities as the computing environment 602. In various embodiments, the client device 608 can send information to the computing environment 602 and/or the measurement device 606. For example, the client device 608 can update personal information and send this data to the computing environment 602.

As will be understood, the system may execute the functionality described above (and elsewhere herein) in any location or in more than one location. For example, the system may be configured to process all data or only some data at the computing environment 602, measurement device 606, or client device 608.

Figure 7A:
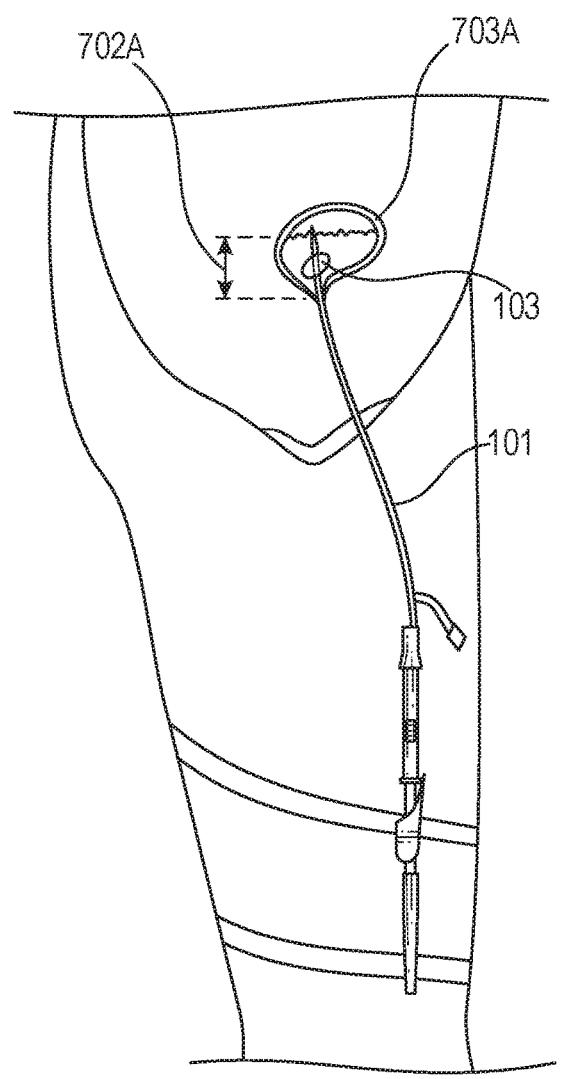
FIG. 7A illustrates an anatomical view of the bladder fullness detection system inserted into a bladder, according to one embodiment of the present disclosure.
Figure 7B:
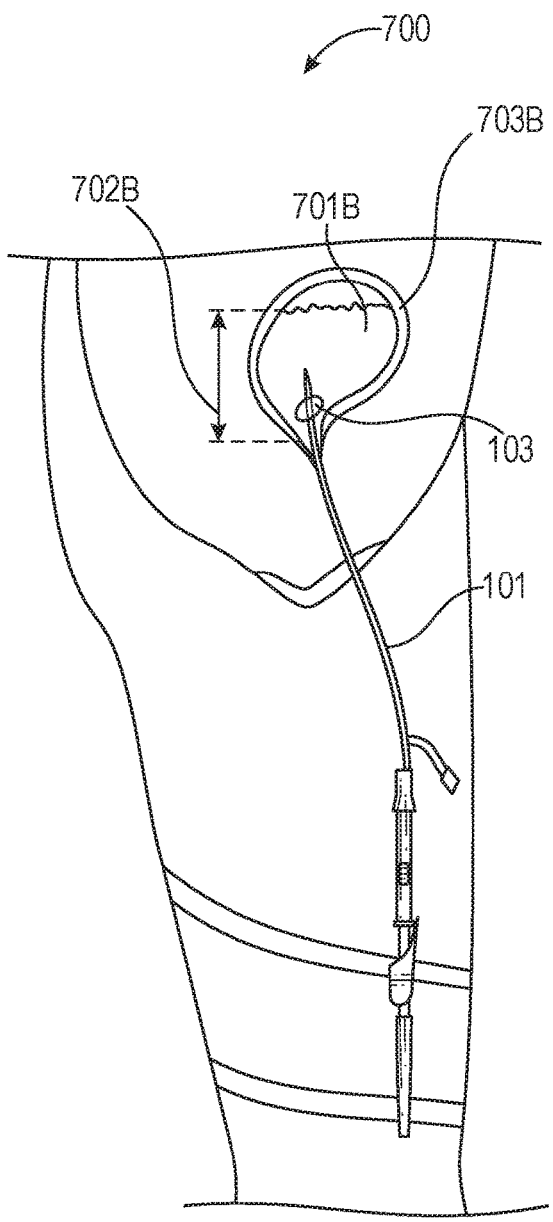
FIG. 7B illustrates an anatomical view of the bladder fullness detection system inserted into a bladder, according to one embodiment of the present disclosure.

Referring now to FIG. 7A and FIG. 7B, illustrated is an anatomical view of the bladder fullness detection system 200 inserted into a bladder, according to one embodiment of the present disclosure. In some embodiments, a small bladder 703A is empty and/or substantially empty. In particular embodiments, a large bladder 703B is full and/or substantially full. In various embodiments, the measurement device 606 employs the hydrostatic pressure principle to calculate pressure. In one or more embodiments, the hydrostatic pressure principle is defined as a method for calculating pressure at a given point by multiplying the column's density, gravity, and height for a hydrostatic system. In some embodiments, the bladder expands with a degree of elasticity as it fills and the vertical fluid level of urine increases. In at least one embodiment, the increased fluid levels generate an increase in hydrostatic pressure sensed by the measurement device 606, given that the individual's bladder is located above the end of the catheter. In various embodiments, the measurement device 606 includes a data processing step to separate bladder filling from artifacts. In particular embodiments, artifacts include, but are not limited to, bladder spasms and changes in the pressure of other body compartments, such as intra-abdominal pressure or rectal pressure. In at least one embodiment, the measurement device 606 approximates the actual "fullness" of the bladder based on adjustments caused by particular artifacts.

Figure 13:
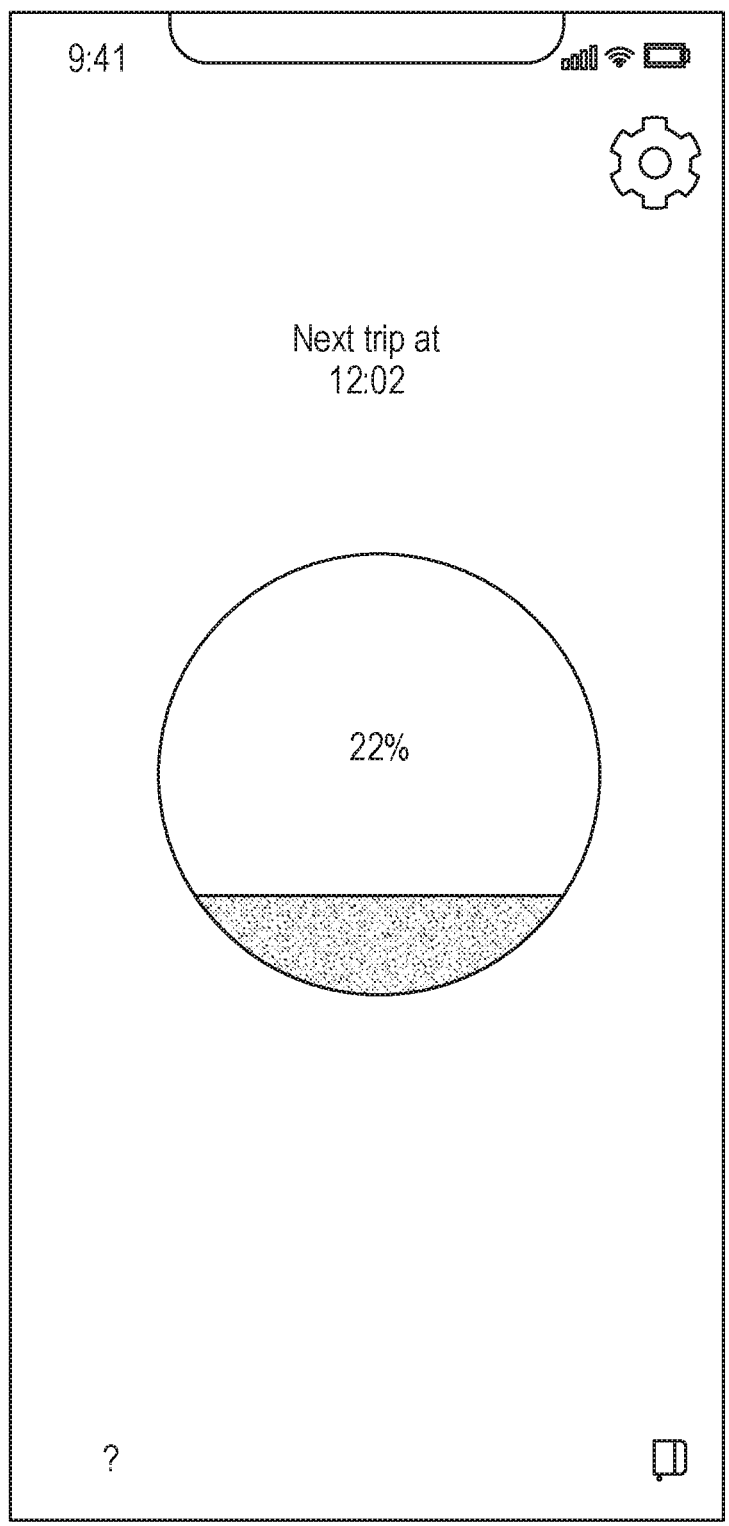
FIG. 13 illustrates an exemplary dashboard for the user to interface with the device data, according to one embodiment of the present disclosure.

In particular embodiments, the small bladder 703A is empty or nearly empty and acts as a baseline state for bladder fullness measurements. In at least one embodiment, the large bladder 703B is full or ready to void as declared by a medical professional, and acts as a baseline state for threshold comparisons. In one or more embodiments, the small bladder 703A and the large bladder 703B are the same bladder but in different fullness states. In some embodiments, the small bladder 703A is nearly empty due to the catheter eyelets positioned above the catheter balloon 103. In various embodiments, having a catheter eyelet above the catheter balloon 103 creates a small pocket where urine may accumulate and remain when the bladder is emptied. As the bladder fills, urine may accumulate and begin to fill the catheter tube 101. In at least one embodiment, the bladder fullness detection system 200 may measure an initial urine height 702A by subtracting the known catheter tube 101 length from the measured total pressure column height. In various embodiments, the small bladder 703A expands as more urine is produced. The bladder fullness detection system may continue to measure the hydrostatic column height. In one or more embodiments, the measured bladder fullness may measure a larger urine height 702B in the larger bladder 703B and recognize the bladder has reached a fullness threshold 701B. The measurement device 606 and/or the computing environment 602 may notify the client device 608 stating to void the user's bladder once the fullness threshold 701B has been met. In particular embodiments, the measurement device 608 can send a notification based on reached percentages of the fullness threshold 701B. For example, the measurement device 606 and/or the computing environment 602 can notify the client device that the user's bladder has met 75% of the fullness threshold 701B. In some embodiments, a constant percentage can be displayed by the client device 608, as shown in FIG. 13.

Figure 8:
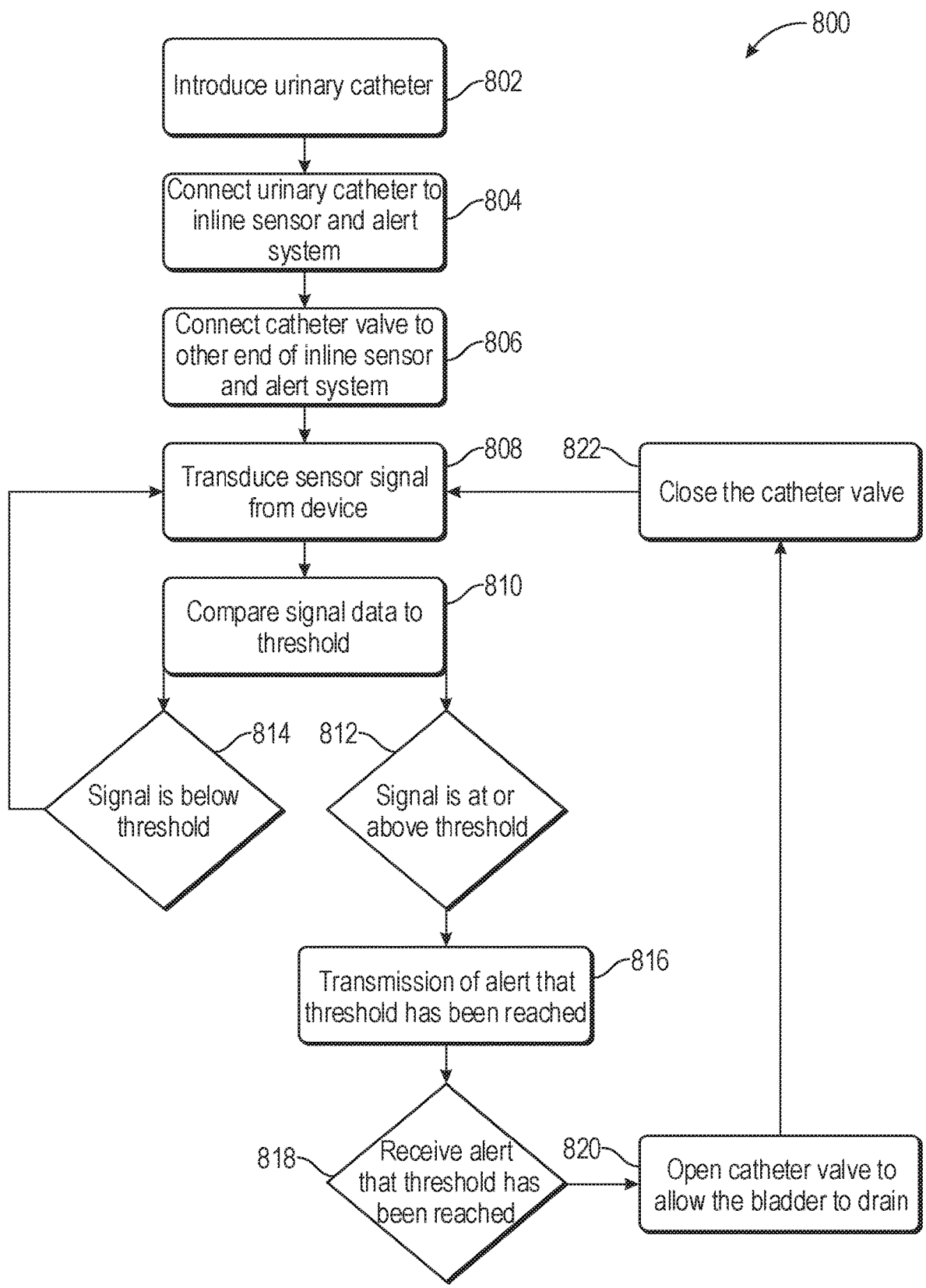
FIG. 8 shows a flowchart of a use case scenario for the bladder fullness detection system, according to one embodiment of the present disclosure.

Referring now to FIG. 8, shown is a flowchart of a process 800, according to one embodiment of the present disclosure. In particular embodiments, referring to steps 802-806, the bladder manager (e.g., the user, the caretaker, the medical team, or a combination of those individuals) begins the process 800. In particular embodiments, at step 802, the bladder manager introduces a urinary catheter into the user and secures the catheter into place. In various embodiments, at steps 804 and 806, the bladder manager connects the bladder fullness detection system 200 to the distal end of the catheter tube 101 and connects a catheter valve 102 to the front hollow element 201 of the bladder fullness detection system 200. In one or more embodiments, at 808 and 810, the bladder fullness detection system 200 gathers and transmits the bladder fullness information and compares that signal to a threshold. In particular embodiments, if the signal is below the threshold, the process 800 moves back to step

808. In an embodiment, at steps 816 and 818, if the signal is above the threshold, the measurement device 606 transmits an alert to void the user's bladder to the client device 608. In some embodiments, and at steps 820 and 822, the measurement device 606 or a user can electronically or manually open the catheter valve 102, respectively. At step 822, once the user voids their bladder and closes the valve, the process 800 may return to step 808.

In at least one embodiment, during the introduction of the catheter at step 802, the bladder manager inserts the catheter through the urethra or stoma for a urethral or suprapubic catheter, respectively. In various embodiments, once the catheter is inserted, the catheter balloon 103 is inflated using saline to anchor the catheter in place. Once the catheter is secured in place by the catheter balloon 103, the process 800 may proceed to step 804.

In particular embodiments, step 804 begins with connecting the bladder fullness detection system 200 to the catheter tube 101 up to joining edge 111.

At step 806, the catheter accessory (e.g., catheter valve) connects to the first hollow element 201 of the bladder fullness detection system 200. In some embodiments, the catheter valve 102 is secured into place.

In various embodiments, at step 808, the measurement device 606 gathers raw signal data. In one or more embodiments, the signal may then pass through an algorithm to filter artifacts and determine a metric of "bladder fullness." In particular embodiments, the measurement device 606 also includes functionality to predict future bladder fullness information.

At step 810, the measurement device 606 and/or the computing environment 602 compares the bladder fullness measurement to the desired fullness threshold, according to one embodiment of the present disclosure. In various embodiments, the bladder fullness threshold is either pre-programmed for all users or is customized for a particular user by the bladder manager.

In at least one embodiment, if the measured bladder fullness is below the threshold, the process returns to step 808. In certain embodiments, when the bladder fullness is at or above the threshold, the process proceeds to step 816.

At step 816, the measurement device 606 transmits an alert to the client device 608 to notify the user. In various embodiments, the bladder fullness detection system 200 sends an alert to the user via a light emitting diode or an auditory alarm.

At step 818, the bladder manager receives the notification from the measurement device 606, according to some embodiments of the present disclosure. These notifications may repeat if the alert in step 818 is not acknowledged and the bladder fullness remains above the fullness threshold.

At step 820, the bladder manager finds a suitable receptacle for urine disposal and opens the catheter valve 102 to allow urine outflow and empty the user's bladder, according to one embodiment of the present disclosure. The bladder manager may then determine when the bladder is sufficiently emptied.

At step 822, the bladder manager may close the catheter valve to prevent further urine outflow and allow the user to perform other activities. In some embodiments, the process 800 proceeds to step 808 from step 822.

Figure 9:
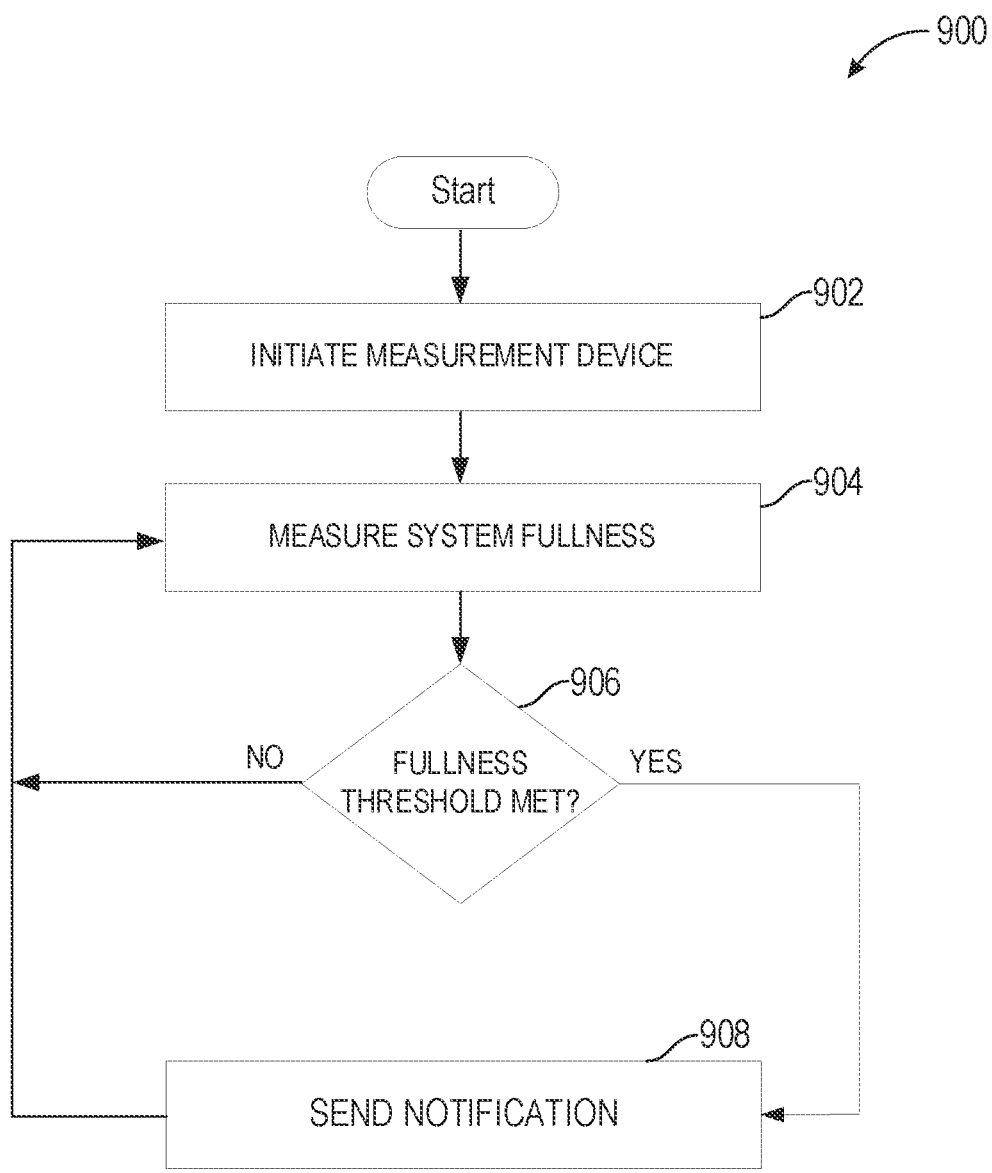
FIG. 9 shows a flowchart of a process for a bladder fullness detection system, according to one embodiment of the present disclosure.

Referring now to FIG. 9, shown is a flowchart of the process 900, according to one embodiment of the present disclosure. In particular embodiments, the process 900 relates to the functionality of the measurement device 606 of the bladder fullness detection system 200.

At step 902, the measurement device 606 is initiated, according to one embodiment of the present disclosure. In various embodiments, initiating the measurement device 606 includes turning the device on and pairing the device with a client device 608. In some embodiments, once the measurement device 606 is initiated, the device only turns off by power loss and other occurrences.

At step 904, the measurement device 606 begins to measure pertinent data, according to one embodiment of the present disclosure. In some embodiments, the measurement device 606 measures parameters such as the hydrostatic pressure and applies filtering or smoothing algorithms to the data. In one or more embodiments, the measurement device 606 employs a conversion algorithm to determine fullness from the filtered or raw signal.

At step 906, the measurement device 606 determines if the fullness threshold has been met, according to one embodiment of the present disclosure. In various embodiments, the measurement device 606 compares the fullness data to the bladder fullness threshold. In at least one embodiment, if a fullness threshold is not met, then the device returns to process 904. In some embodiments, if a fullness threshold has been met, then the device enters step 908.

At step 908, the measurement device 606 sends a notification to the client device 608. In at least one embodiment, the notification is sent over a network 604 to a client device 608. After sending the notification, the device may wait for a set amount of time to prevent sending notifications too frequently. In particular embodiments, the process 900 returns to step 904.

Figure 10:
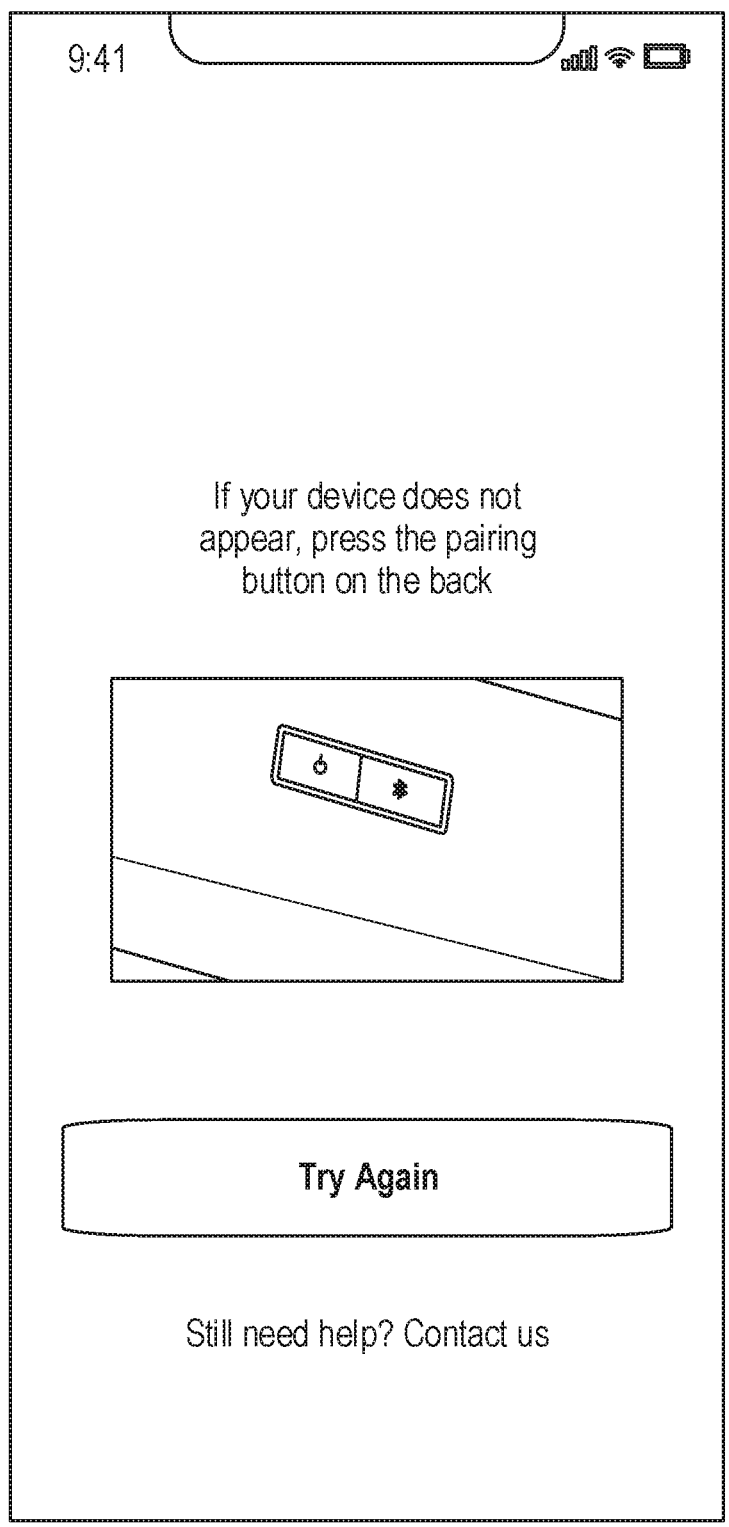
FIG. 10 illustrates a measurement device pairing environment, according to one embodiment of the present disclosure.

Referring now to FIG. 10, illustrated is a measurement device 606 pairing environment, according to one embodiment of the present disclosure. In at least one embodiment, the client device 608 includes software that connects over the network 604 to the bladder fullness detection system 200. This software may include an illustration of buttons on the bladder fullness detection system 200, specifically a pairing button that may cause the device to open a connection over a Bluetooth network. In one or more embodiments, the user interface illustrates the bladder fullness and detection system 200 with a pairing button and a power button. In some embodiments, the user presses the pairing button to connect the bladder fullness detection system 200 to the client device 608.

Figure 11:
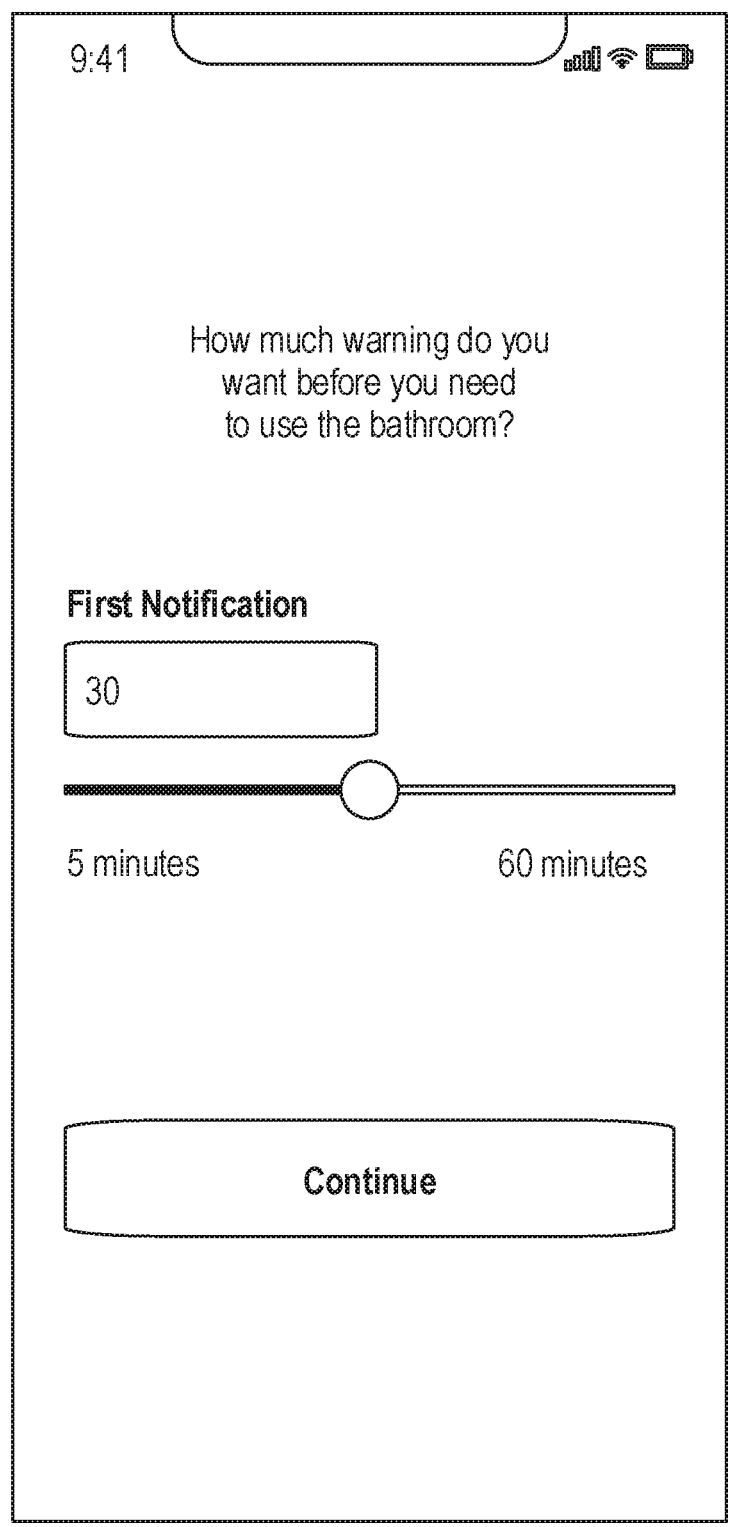
FIG. 11 shows a user-customizable notification editor, according to one embodiment of the present disclosure.

Referring now to FIG. 11, illustrated is a potential setup screen for choosing or setting notifications via the client device 608, according to one embodiment of the present disclosure. In some embodiments, the bladder fullness detection system 200 sends notifications and/or data to the client device 608 about the fullness of the user's bladder. In at least one embodiment, these notifications are sent over a network 604 using software installed on the client device 608. In various embodiments, the notifications are sent anywhere in the range of approximately 5 to 60 minutes before the predicted bladder voidance time. In particular embodiments, the user selects how early they receive the first notification. In at least one embodiment, a notification is sent when complete bladder fullness is detected.

Figure 12:
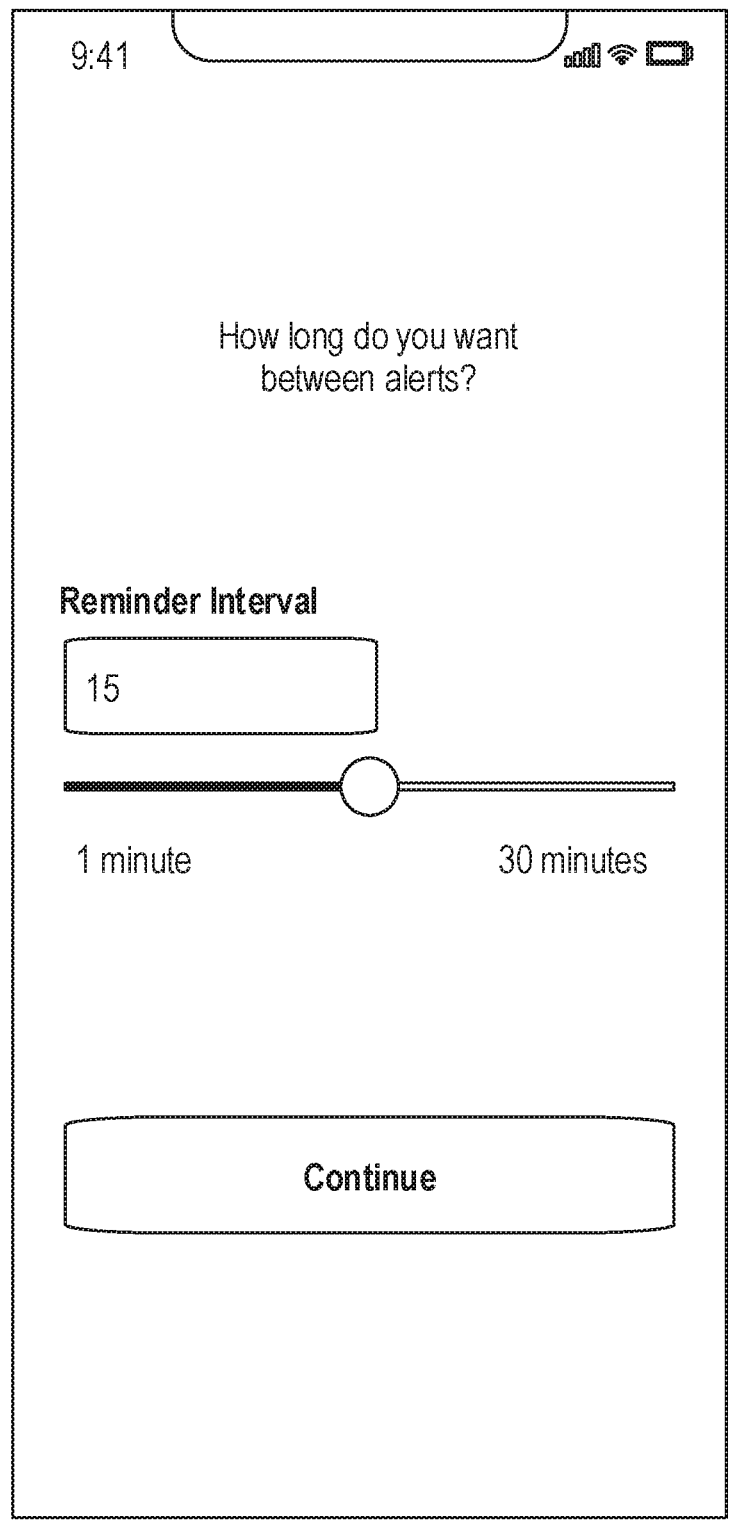
FIG. 12 shows a notification interval editor, according to one embodiment of the present disclosure.

Referring now to FIG. 12, illustrated is a follow-up notification setting, according to one embodiment of the present disclosure. In at least one embodiment, the user chooses notification frequency regarding their bladder fullness. The device may stop sending notifications to the user once the user has voided their bladder. In particular embodiments, the device also increases notification frequency if the user's bladder fills beyond a safe level, as indicated by a medical professional. In various embodiments, the user may select to receive an additional notification approximately every 1 to 30 minutes following the initial notification until they void their bladder. For example, the user defines a 5 minute time interval for follow-up notifications if the bladder is not voided after the first notification. Continuing this example, after the client device 608 receives an initial notification and the bladder has not been voided, the measurement device 606 and/or the computing environment 602 sends follow-up notifications to the client device 608 every 5 minutes. Continuing this example, the measurement device 606 and/or the computing environment 602 stops sending notifications once the bladder is voided.

Referring now to FIG. 13, illustrated is an exemplary dashboard, according to one embodiment of the present disclosure. In some embodiments, the client device 608 displays the approximate bladder fullness as detected by the bladder fullness detection system 200. In particular embodiments, the client device 608 displays the next approximate voiding time determined by the data processing console 642 in the computing environment 602. In at least one embodiment, the user interface also contains elements that allow users to change notification timing and frequency. In at least one embodiment, this screen may also contain elements that allow a user to access a list of historical voiding times and volumes.

Figure 14:
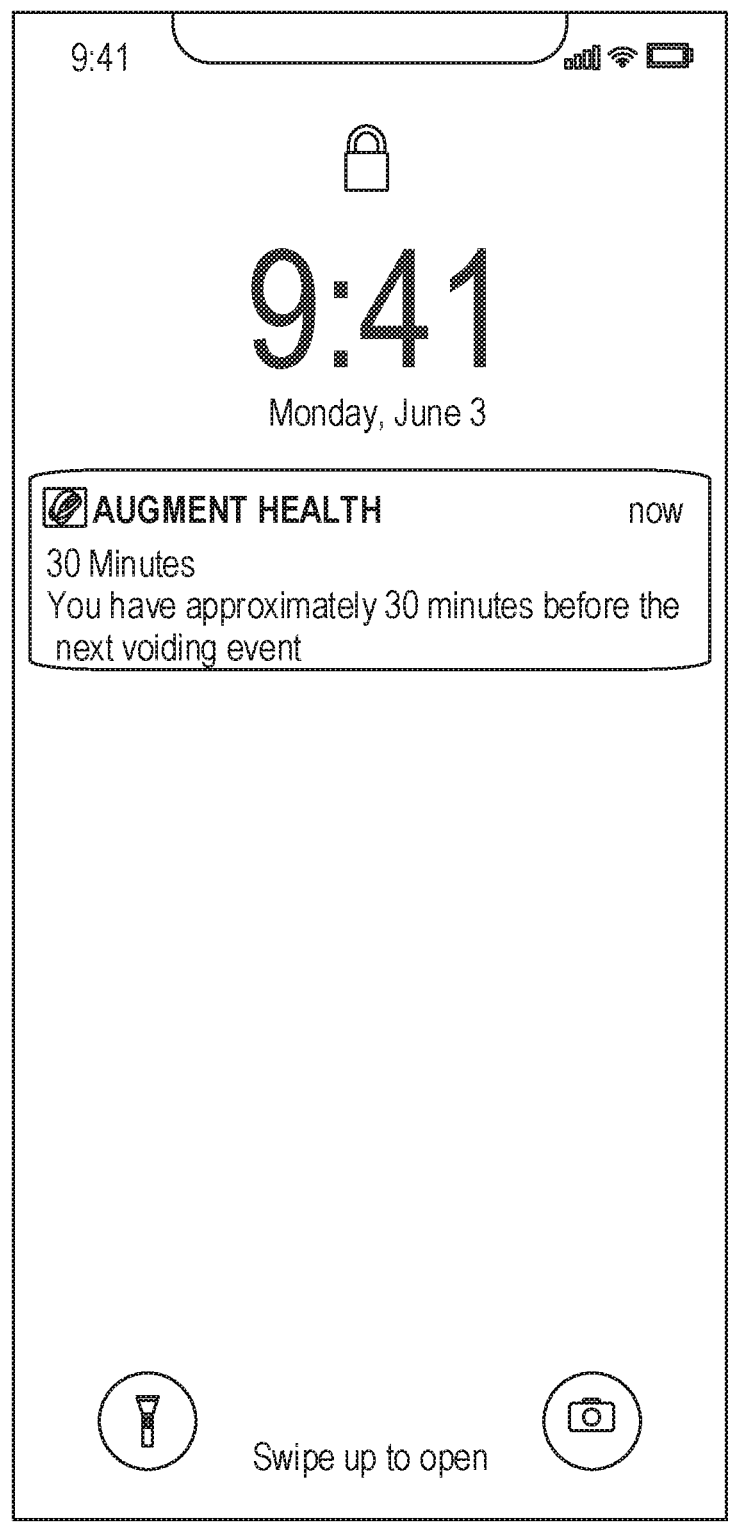
FIG. 14 shows a notification on the client device, according to one embodiment of the present disclosure.

Referring now to FIG. 14, illustrated is a notification sent to a client device 608, according to one embodiment of the present disclosure. In certain embodiments, the notification contains information about when the next predicted voiding event occurs. In at least one embodiment, the notification contains information that indicates the notification is a warning about bladder fullness.

Additional Exemplary Features

In particular embodiments, the bladder fullness detection system 200 manages the effects of overflow incontinence. In some embodiments, a typical urinary incontinence regulation system includes a urinary catheter inserted into the patient's urinary tract. The urinary catheter insert may reach the bladder on one end and connect to a drainage device on the other end. In various embodiments, the urinary incontinence regulation system is connected to the bladder fullness and detection system 200 in-line between the catheter and the drainage device, wherein the drainage device is a catheter valve.

In at least one embodiment, the feedback from the bladder fullness detection system 200 periodically sends a maximum bladder volume alert to the patient or caretaker. In alternative embodiments, the bladder fullness and detection system 200 does not send a maximum bladder volume alert to the user and/or caretaker, and instead, the bladder fullness detection system 200 signal is configured to open the connected urinary catheter valve 102 for drainage.

In some embodiments, the bladder fullness detection system 200 functions in a diagnostic or monitoring capacity for personal, medical, or research purposes. In various embodiments, when the bladder fullness detection system 200 functions as a diagnostic tool, the bladder fullness detection system 200 sends a raw signal or threshold occurrences to a patient or other facilitator, but the signal is not explicitly used for the mitigation of overflow incontinence symptoms. These data may be of value for urodynamic studies (e.g., urodynamics, ambulatory urodynamics, voiding diaries).

In particular embodiments, a gyroscope or inertial measurement unit may be added to the bladder fullness detection system 200 to enable broader data collection, such as measuring the angle or position of the catheter relative to the body to account for changes in measured pressure. In particular embodiments, measured pressure changes are possibly due to postural changes between standing and sitting. The bladder fullness detection system 200 may be integrated with an internal valve, such that it replaces the catheter valve 102 or other catheter end accessories. In some embodiments, the bladder fullness detection system 200 is integrated with a catheter such that it replaces the conventional catheter.

In some embodiments, the bladder fullness detection system 200 is integrated with the catheter system and catheter valve 102, such that it is a singular device and that device may be reusable or disposable.

In particular embodiments, the bladder fullness detection system 200 may include a safety valve to prevent the bladder from reaching potentially destructively high pressures or an indicator (e.g., alarm or light) to notify the user in the event of system failure.

CONCLUSION

The embodiments were chosen and described in order to explain the principles of the claimed systems and processes and their practical application so as to enable others skilled in the art to utilize the various embodiments and with various modifications as are suited to the particular use contemplated. Alternative embodiments will become apparent to those skilled in the art to which the systems and processes pertain without departing from their spirit and scope. Accordingly, the scope of the claimed inventions is defined by the appended claims rather than the foregoing description and the exemplary embodiments described therein.

What is claimed is:

1. A system comprising:
a front hollow interior fluidly connected to a catheter for extending into a patient's bladder;
one or more transducers for continuously measuring hydrostatic pressure data of a hydrostatic pressure column extending through the front hollow interior and into the patient's bladder;
at least one transmitter for transmitting the hydrostatic pressure data to a computing system for determining a bladder fullness level; and
the computing system comprising at least one processor, wherein the computing system is configured to:
receive the hydrostatic pressure data from the at least one transmitter;
filter the hydrostatic pressure data to remove one or more artifacts in the hydrostatic pressure data;
continuously compute the bladder fullness level based on filtered hydrostatic pressure data;
continuously compare the bladder fullness level to a predetermined threshold; and
provide a visualization of the bladder fullness level and comparison of the bladder fullness level to the predetermined threshold; and
provide one or more notifications to the patient, wherein the one or more notifications comprises an initial notification that is determined based on the patient's mobility and provided to the patient at a time prior to an expected voiding event.

2. The system of claim 1, wherein the computing system is configured to provide an indication of a voiding time based on the comparison of the bladder fullness level to the predetermined threshold.

3. The system of claim 2, wherein:
the voiding time is a future voiding time; and
the computing system is configured to provide the indication of the future voiding time based on the comparison of the bladder fullness level to the predetermined threshold.

4. The system of claim 2, wherein:
the voiding time is a past voiding time; and
the computing system is configured to provide the indication of the past voiding time based on the comparison of the bladder fullness level to the predetermined threshold.

5. The system of claim 2, wherein the computing system is configured to receive the predetermined threshold.

6. The system of claim 5, wherein the computing system is configured to provide a list of historical voiding times and volume.

7. The system of claim 1, wherein the hydrostatic pressure data is filtered by utilizing at least one of a high pass filter and a low pass filter to remove noise in the hydrostatic pressure data.

8. The system of claim 1, wherein the hydrostatic pressure data is filtered by calculating a moving average of the hydrostatic pressure data.

9. The system of claim 1, wherein the computing system is configured to perform machine learning techniques to create one or more predictive models of a user's bladder habits.

10. The system of claim 9, wherein the machine learning techniques include determining a likelihood that an individual will need to void their bladder at a particular time.

11. The system of claim 1, wherein the computing system provides an estimation of a maximum bladder capacity.

12. The system of claim 1, further comprising:
a back element for receiving the catheter:
a back aperture with a first diameter;
a joining edge aperture with a second diameter; and
a core aperture within a hollow interior, wherein the core aperture comprises the second diameter, wherein the back element further comprises:
the hollow interior extending from the back aperture to the joining edge aperture;
an exterior surface; and
a joining edge extending from the exterior surface proximate the joining edge aperture;
a front element comprising a front aperture and an interior aperture, wherein the front element interfaces with the back element proximate the interior aperture and further comprises:
the front hollow interior between the front aperture and the interior aperture;
a port between the front aperture and the interior aperture and at least two centimeters from the front aperture, the port configured for receiving a measurement housing component, wherein the measurement housing component is operatively connected to the front element; and
wherein the system comprises a constant diameter between the interior aperture and the port.

13. The system of claim 12, wherein:
the joining edge comprises a joint edge exterior surface; and
a diameter of the joining edge at the joint edge exterior surface is greater than the constant diameter of the front hollow interior.

14. The computing system of claim 1, wherein:
the one or more notifications further comprise an alert; and
the one or more notifications is re-sent if a patient caretaker does not acknowledge the alert.

15. The computing system of claim 1, wherein the computing system waits a predetermined amount of time prior to sending a subsequent notification to prevent sending notifications too frequently.

16. The computing system of claim 1, wherein the computing system increases a frequency at which the one or more notifications is sent if the patient's bladder fills beyond a safe level.

17. The computing system of claim 1, wherein the computing system stops sending the one or more notifications once the patient's bladder is voided.

18. The computing system of claim 1, wherein the at least one processor is configured to continuously compute the bladder fullness level based on filtered hydrostatic pressure data without stimulating the bladder.

19. A computing system comprising:
at least one processor configured to:
receive hydrostatic pressure data based on a hydrostatic pressure column extending through a catheter system and into a patient's bladder from at least one transmitter;
filter the hydrostatic pressure data to remove one or more artifacts in the hydrostatic pressure data;
continuously compute a bladder fullness level based on filtered hydrostatic pressure data;
continuously compare the bladder fullness level to a predetermined threshold; and
provide a visualization comprising a diagram that illustrates the bladder fullness level and compares the bladder fullness level to the predetermined threshold.

20. The computing system of claim 19, wherein the at least one processor is configured to continuously compute the bladder fullness level based on filtered hydrostatic pressure data without stimulating the bladder.

* * * * *